United States Patent
Ahn

(10) Patent No.: US 7,649,068 B2
(45) Date of Patent: Jan. 19, 2010

(54) POLYMER PARTICLES AND ENCAPSULATED COMPOSITIONS USING ORGANOBORANE AMINE COMPLEXES

(75) Inventor: Dongchan Ahn, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 257 days.

(21) Appl. No.: 11/794,418

(22) PCT Filed: Jan. 11, 2006

(86) PCT No.: PCT/US2006/000767

§ 371 (c)(1),
(2), (4) Date: Jun. 28, 2007

(87) PCT Pub. No.: WO2006/088571

PCT Pub. Date: Aug. 24, 2006

(65) Prior Publication Data

US 2008/0085983 A1    Apr. 10, 2008

Related U.S. Application Data

(60) Provisional application No. 60/653,342, filed on Feb. 16, 2005.

(51) Int. Cl.
- C08F 220/18 (2006.01)
- B01J 13/14 (2006.01)
- C08K 9/08 (2006.01)
- C08L 83/00 (2006.01)
- C08F 2/06 (2006.01)

(52) U.S. Cl. ................ 528/5; 528/7; 526/198
(58) Field of Classification Search ........... 528/5, 528/7
See application file for complete search history.

(56) References Cited

U.S. PATENT DOCUMENTS 2,676,182 A    4/1954  Daudt et. al.

(Continued)

FOREIGN PATENT DOCUMENTS

EP    1156653    7/1969

(Continued)

OTHER PUBLICATIONS

Fujisawa, Seiichiro; Imai, Yoji and Masuhara, Eiichi; "Studies on Dental Self-Curing Resins (11); Characterization of the various complexes of tri-n-butyl borane as an initiator," Dow Corning Corporation.

(Continued)

Primary Examiner—Randy Gulakowski
Assistant Examiner—Robert Loewe
(74) Attorney, Agent, or Firm—Catherine U. Brown

(57) ABSTRACT

A polymerized product is obtained from a mixture containing (i) a free radical polymerizable monomer, oligomer or polymer; (ii) an organoborane amine complex, (iii) a poor or non-solvent for the polymerized product of (i); and (iv) an amine reactive compound. The mixture may include (v) an active ingredient to be encapsulated by the polymerized product, and (vi) an optional component(s). Polymer particles are obtained by (A) forming a composition containing components (i)-(iv); (B) agitating components (i)-(iv) in the presence of oxygen to initiate polymerization, at a rate and for a time sufficient to provide a uniform dispersion and reaction of the components; (C) allowing the reaction to proceed to completion at room temperature; and (D) recovering the polymer particles by removing component (iii). The composition may include (v) the active ingredient to be encapsulated by the polymer particles.

40 Claims, 2 Drawing Sheets

10μm

U.S. PATENT DOCUMENTS

| | | | |
|---|---|---|---|
| 3,025,284 A * | 3/1962 | George et al. | 526/197 |
| 3,275,611 A | 9/1966 | Mottus et. al. | |
| 3,311,579 A * | 3/1967 | Donat | 524/777 |
| 3,372,153 A * | 3/1968 | Turner et al. | 528/496 |
| 3,560,462 A * | 2/1971 | Farber et al. | 526/345 |
| 3,635,752 A * | 1/1972 | Baer et al. | 427/242 |
| 3,679,645 A * | 7/1972 | Hort | 526/68 |
| 3,691,123 A * | 9/1972 | Clarke et al. | 524/545 |
| 3,810,958 A * | 5/1974 | Takahashi et al. | 526/201 |
| 3,897,586 A * | 7/1975 | Coker | 428/403 |
| 4,584,355 A | 4/1986 | Blizzard et al. | |
| 4,585,836 A | 4/1986 | Homan et al. | |
| 4,591,722 A | 5/1986 | Biddlecombe et al. | |
| 4,806,581 A * | 2/1989 | Walker | 524/178 |
| 4,904,562 A * | 2/1990 | Yusa et al. | 430/138 |
| 5,106,928 A * | 4/1992 | Skoultchi et al. | 526/196 |
| 5,310,835 A * | 5/1994 | Skoultchi et al. | 526/198 |
| 5,539,070 A * | 7/1996 | Zharov et al. | 526/198 |
| 5,616,796 A * | 4/1997 | Pocius et al. | 564/9 |
| 5,684,102 A | 11/1997 | Pocius et al. | |
| 5,700,875 A * | 12/1997 | Zeng et al. | 525/301 |
| 5,795,657 A | 8/1998 | Pocius et al. | |
| 5,852,140 A | 12/1998 | Georges et al. | |
| 5,872,197 A | 2/1999 | Deviny | |
| 5,990,036 A | 11/1999 | Deviny | |
| 6,008,308 A | 12/1999 | Pocius | |
| 6,284,381 B1 | 9/2001 | Zharov et al. | |
| 6,620,515 B2 | 9/2003 | Feng et al. | |
| 6,706,831 B2 | 3/2004 | Sonnenschein et al. | |
| 6,740,716 B2 * | 5/2004 | Webb et al. | 526/196 |
| 6,762,260 B2 | 7/2004 | Sonnenschein et al. | |
| 6,777,512 B1 | 8/2004 | Sonnenschein et al. | |
| 6,806,330 B1 | 10/2004 | Sonnenschein et al. | |
| 6,812,308 B2 * | 11/2004 | Deviny et al. | 526/196 |
| 7,098,279 B2 * | 8/2006 | Maandi et al. | 526/195 |
| 2002/0028894 A1 * | 3/2002 | Sonnenschein et al. | 526/198 |
| 2002/0033227 A1 | 3/2002 | Sonnenschein et al. | |
| 2002/0058764 A1 | 5/2002 | Sonnenschein et al. | |
| 2004/0242812 A1 * | 12/2004 | Sonnenschein et al. | 526/124.6 |
| 2007/0246245 A1 * | 10/2007 | Ahn et al. | 174/126.2 |
| 2007/0298223 A1 * | 12/2007 | Loch et al. | 428/172 |
| 2008/0050552 A1 * | 2/2008 | Ahn et al. | 428/98 |

FOREIGN PATENT DOCUMENTS

| | | |
|---|---|---|
| EP | 0 339 803 B1 | 1/1992 |
| GB | 1156653 | 7/1969 |
| WO | WO 2001/44311 A1 | 6/2001 |
| WO | WO 2006/049792 A1 | 5/2006 |
| WO | WO 2006/073695 A1 | 7/2006 |
| WO | WO 2006/073696 A1 | 7/2006 |
| WO | WO 2007/040794 A1 | 4/2007 |

OTHER PUBLICATIONS

Childs, William R. and Nuzzo, Ralph G., "Decal Transfer Microlithography: A New Soft-Lithographic Patterning Method," J. Am. Chem. Soc., 2002, vol. 124, No. 45, pp. 13583-13596.

Xia, Younan and Whitesides, George M., "Soft Lithography," Annual Review of Materials Science, vol. 28, 1998, pp. 153-184, Department of Chemistry and Chemical Biology, Harvard University, Cambridge, Massachusetts.

Soderquist, John A., and Brown, Herbert C., "Hydroboration. 56. Convenient and Regiospecific Route to Functionalized Organosilanes through the Hydroboration of Alkenylsilanes," J. Org. Chem. 1980, vol. 45, pp. 3571-3578.

DeSimone, J.M.; Maury, E.E.; Menceloglu, Y.Z.; McClain, J.B.; Romack, T.J.; Combes, J.R.; "Dispersion Polymerizations in Supercritical Carbon Dioxide," Science, New Series, vol. 265, No. 5170, Jul. 15, 1994, pp. 356-359.

Arshady, R., "Suspension, emulsion, and dispersion polymerization: A methodological survey," Colloid & Polymer Science, vol. 270, No. 8, 1992, pp. 717-732.

* cited by examiner

10μm

1μm

POLYMER PARTICLES AND ENCAPSULATED COMPOSITIONS USING ORGANOBORANE AMINE COMPLEXES

CROSS REFERENCE TO RELATED APPLICATIONS

This application is a U.S. national stage filing under 35 U.S.C. §371 of PCT Application No. PCT/US2006/00767 filed on 11 Jan. 2006, currently pending, which claims the benefit of U.S. Provisional Patent Application No. 60/653,342 filed 16 Feb. 2005 under 35 U.S.C. §119 (e). PCT Application No. PCT/US2006/00767 and U.S. Provisional Patent Application No. 60/653,342 are hereby incorporated by reference.

CROSS-REFERENCE TO RELATED APPLICATIONS

None

STATEMENT REGARDING FEDERALLY SPONSORED RESEARCH

None

BACKGROUND OF THE INVENTION

This invention is directed to compositions that generate polymer microparticles upon polymerization. More specifically, the compositions contain free radical polymerizable monomers, oligomers or polymers, that polymerize or crosslink in the presence of an organoborane amine complex, upon exposure to an amine-reactive compound, or by exposure to heat or radiation. The reaction is carried out in a medium containing at least one poor or non-solvent for the resulting polymer, in order to form microparticles. The invention further relates to a process for making the microparticles, and to a method of encapsulating an active ingredient in a polymeric matrix using the composition.

Polymeric microparticles have many uses in the area of encapsulation of active ingredients, such as pharmaceutical agents, agricultural chemicals, vitamins, catalysts, curing agents, reactive species for curable materials, adhesion promoters in adhesives, flame retardants in plastics, fragrances, oils, and lotions for cosmetics. For example, the shelf life of a one part, i.e., in one package, curable silicone elastomer, may be extended substantially, by encapsulating curing catalysts such as tin or platinum in a polymeric resin particle. Such a process of encapsulation is described in European Patent 339 803 (Jan. 15, 1992), in which a platinum group metal catalyst that is microencapsulated in a thermoplastic resin, is recovered by atomizing a polymer emulsion, in which the catalyst containing microcapsules are held, and then entraining the resulting finely divided droplets, in a stream of heated gas, to rapidly evaporate the liquid on the exterior of the microcapsules, to form a free flowing powder. However, this spray drying operation is quite costly, and is limited in the range of particle sizes that can be obtained.

Polymeric fine particles are also useful in their own right in a variety of applications including their use as spacer beads in liquid crystal displays, electronic inks in electrophoretic displays, modifiers for adhesives, toners and toner additives for xerography and printing devices, additives for paints, pigments, powder coatings, thermoplastic and thermosetting materials, and packings for chromatographic columns.

Methods for making such polymer microparticles are known in the art. Mechanical grinding or crushing of bulk polymers may be used to form fine particles. Mechanical processes such as high speed rotary milling, or jet milling, however, have the inherent drawback of being post processing steps for the polymer. Additionally, such processing equipment is energy intensive, as well as being costly to implement and maintain. Therefore, the direct polymerization of microparticles is often preferred when possible.

These polymerizations are typically carried out as heterogeneous reactions such as emulsion polymerization, non-aqueous dispersion polymerization, precipitation polymerization, and suspension polymerization. A detailed review of such techniques is contained in an article by R. Arshady in the Journal of Colloid and Polymer Science, Volume 270, Pages 717-732 (1992).

While emulsion polymerization can result in fine uniform polymer microparticles, this technique suffers from the disadvantage that it requires surfactants that are often environmentally undesirable. Non-aqueous dispersion polymerization and precipitation polymerization utilize organic solvents, and therefore require removal of large quantities of organic solvents. While suspension polymerization does not require surfactants since the monomer is mechanically dispersed or suspended in water, the resulting particle sizes tend to be larger than what is afforded by the other techniques.

Recent microparticle polymerization technologies utilizing supercritical carbon dioxide as the reaction medium, can eliminate the need for handling large quantities of organic solvents, and are described by J. M. DeSimone et al., Science, New Series, Volume 265, No. 5170 Pages 356-359, (Jul. 15, 1994). However, these techniques require pressurized reaction equipment. Free radical polymerization to form microparticles by any of the previously mentioned heterogeneous polymerization techniques is accomplished through conventional peroxide or azo-type free radical initiators typically requiring elevated temperatures to initiate polymerization. While improvements have been made for each of these techniques, they still suffer from limitations in the process complexity.

For example, U.S. Pat. No. 5,852,140 (Dec. 22, 1998) describes a multi-step process for preparing a suspension of polymer particles, with an average diameter of from about 0.1-10 micron ($\mu m$). The first step of this process effects a bulk polymerization of a mixture of at least one monomer, a free radical polymerization inhibitor, and a stable free radical agent, until about 10-50 weight percent of the monomer has been polymerized. The second step is the dispersing of the bulk polymerization product with a high shear mixer into water containing a stabilizing component, to obtain a suspension of droplets having an average particle diameter of 0.1-10 $\mu m$, and then polymerizing the resulting suspension in water. Because the initiator is stable, both the bulk and suspension stages of the polymerization are conducted at a temperature of about 60-160° C., optimally 120-140° C. However, nothing in the public domain describes a process that uses organoborane amine complexes as initiators in the heterogeneous polymerization of microparticles.

Organoborane amine complexes themselves are known. For example, organoborane amine complexes used for the bulk polymerization of acrylic monomers, are described in U.S. Pat. No. 3,275,611 (Sep. 27, 1966). Organoboron compounds such as trialkylboranes by themselves, however, are pyrophoric in the presence of oxygen, so preformed complexes between organoboron compounds and amine compounds are required to have the benefit of imparting improved stability to organoboron compounds such as the trialkylboranes.

Recent modifications on the structure of organoborane amine complexes are also described in U.S. Pat. No. 6,706,831 (Mar. 16, 2004), and their use in acrylate based adhesives. The combination of alkylborane amine complexes with amine reactive decomplexing agents to initiate the polymerization of acrylic adhesives at room temperature, is also described in the '831 patent. While such compositions offer the advantage of rapid cure and adhesion to low energy surfaces, the compositions polymerize to form continuous, monolithic structures such as adhesives, rather than discrete microparticles.

This invention differs distinctly from the prior art of alkylborane-amine complexes in that it requires the presence of a poor or non-solvent for the polymerized product, during the polymerization process. For example, while the presence of a poor or non-solvent is undesirable for the direct formation of monolithic objects such as adhesively bonded joints or rubber parts in compositions known in the art, it has been found herein that this results in the unexpected rapid formation of discrete polymeric particles having an average primary particle size of less than about 10 μm in diameter. Therefore, due to the aforementioned limitations of the processes currently used to make polymer particles, and the encapsulation processes based thereon, there is a need for a facile, low cost route to polymer particles, that can be used for the encapsulation of active ingredients. In this regard, the composition and process according to this invention provide a rapid, low temperature means to prepare and recover polymer particles.

BRIEF SUMMARY OF THE INVENTION

The invention is directed to a composition that is the polymerized product of a mixture comprising (i) a free radical polymerizable monomer, oligomer or polymer; (ii) an organoborane amine complex, (iii) a poor or non-solvent for the polymerized product of (i); and (iv) an amine reactive compound. The mixture may include (v) an active ingredient that is encapsulated by the polymerized product, and (vi) an optional component(s).

The invention is also directed to a method of making polymer particles by (A) forming a composition containing (i) a free radical polymerizable monomer, oligomer or polymer; (ii) an organoborane amine complex, (iii) a poor or non-solvent for the polymerized product of (i); and (iv) an amine reactive compound; (B) agitating components (i)-(iv) of the composition in the presence of oxygen to initiate polymerization at temperatures such as room temperature or below, and for times less than readily possible with known methods, to provide a uniform dispersion and reaction of the components; (C) allowing the reaction to proceed to the formation of polymeric particles; and optionally (D) recovering the polymer particles by removing the poor or non-solvent from the composition. In this embodiment, the composition may include (v) an active ingredient to be encapsulated by the polymer particles. These and other features of the invention will become apparent from a consideration of the detailed description.

BRIEF DESCRIPTION OF THE DRAWING

FIG. 1 shows the active component crystal encapsulated in a sheath of the microparticulate polymer.

FIG. 2 shows the fine structure of the microparticulate coating on the active component crystal.

FIG. 3 shows crystals of the active component.

FIG. 4 shows the fine structure of the surface of a crystal.

DETAILED DESCRIPTION OF THE INVENTION

Figure 1:
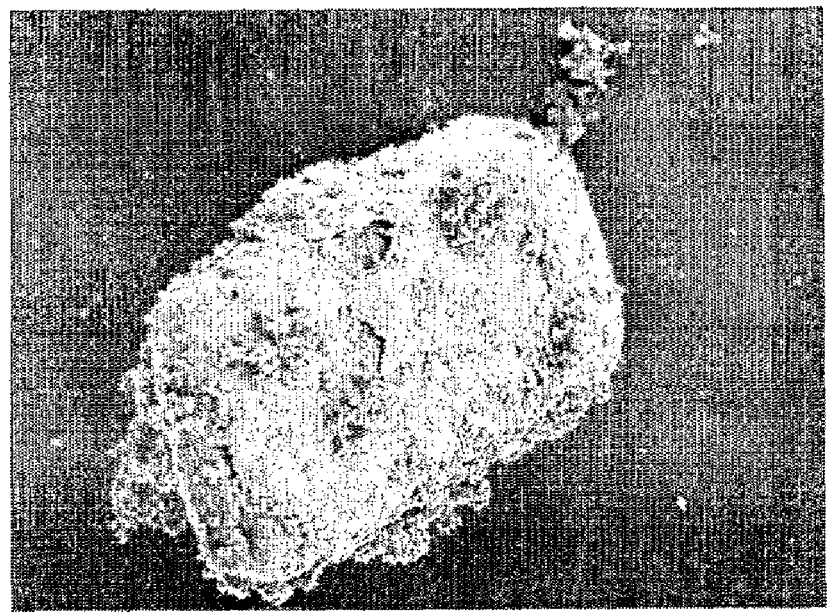
FIGS. 1 and 2 are SEM micrographs of the product of Example 7 at two different magnifications.
Figure 2:
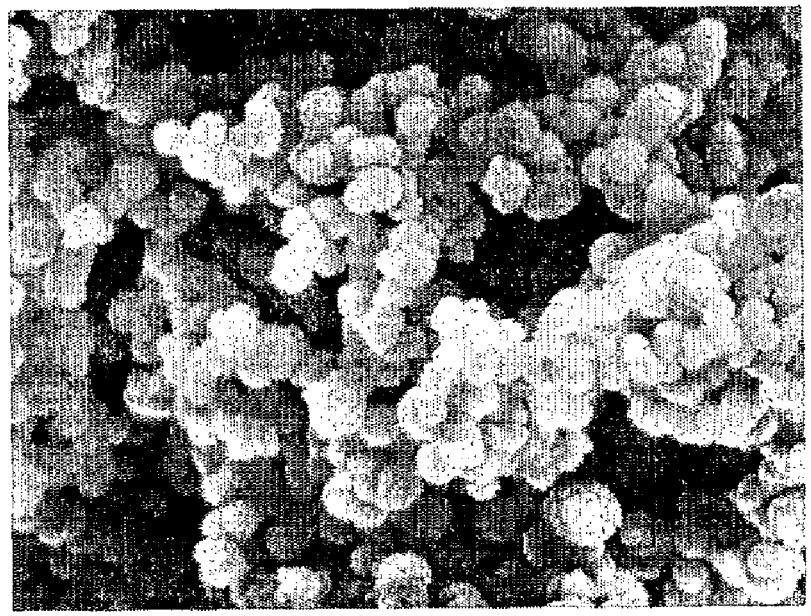
Figure 3:
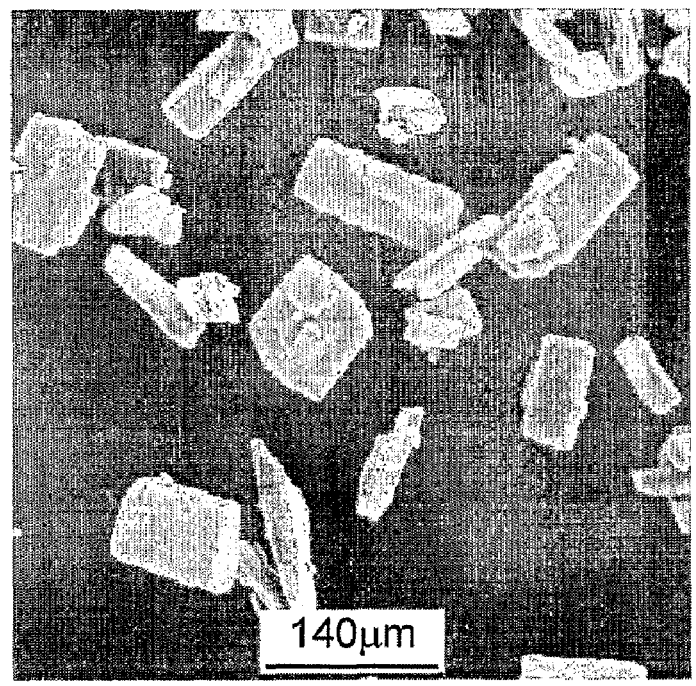
FIGS. 3 and 4 are SEM micrographs of the active component particle prior to encapsulation at two different magnifications.
Figure 4:
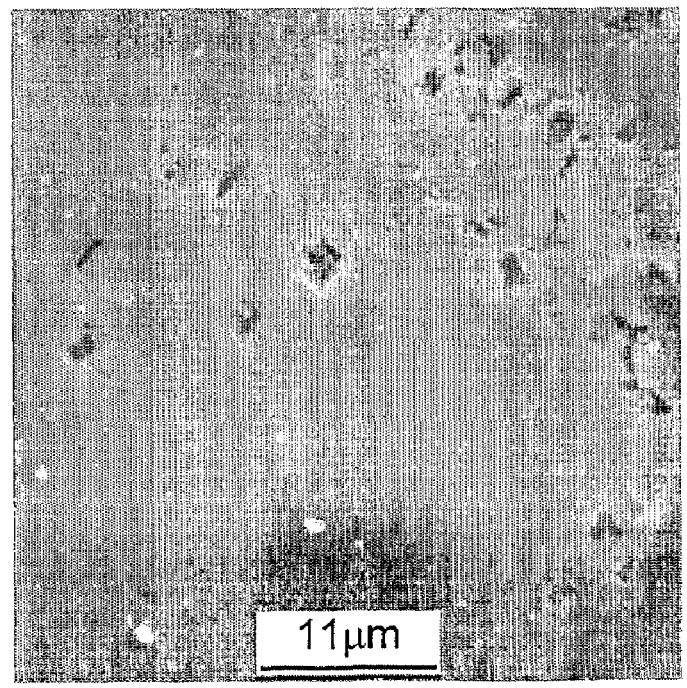

The components used to form compositions and products according to the invention include (i) a free radical polymerizable monomer, oligomer or polymer; (ii) an organoborane amine complex, (iii) a poor or non-solvent for the polymerized product of (i); (iv) an amine reactive compound; (v) an active ingredient; and (vi) an optional component(s). These components are set forth in more detail as follows.

The Free Radical Polymerizable Monomer, Oligomer, or Polymer (i)

Component (i) can be an organic compound, or an organometallic compound such as an organosilicon compound. In either case, it can be a single monomer, oligomer, or polymer containing unsaturation and capable of undergoing free radical polymerization. Mixtures of monomers, oligomers, and polymers can also be used. In many cases, it is preferred to use mixtures of monomer, oligomers, and polymers to impart the desired combination of physical properties such as glass transition temperature, hardness or solubility and surface properties such as hydrophilicity or hydrophobicity. When component (i) is an organic compound, the selected compound will depend on the use of the cured product. Some suitable organic compounds are described in U.S. Pat. No. 6,762,260 (Jul. 13, 2004), including organic compounds such as 2-ethylhexylacrylate, 2-ethylhexylmethacrylate, methylacrylate, methylmethacrylate, neopentyl glycol diacrylate, neopentyl glycol dimethacrylate, glycidyl acrylate, glycidyl methacrylate, allyl acrylate, allyl methacrylate strearyl acrylate, tetrahydrofurfuryl methacrylate, caprolactone acrylate perfluorobutyl acrylate, perfluorobutyl methacrylate, 1H, 1H, 2H, 2H-heptadecafluorodecyl acrylate, 1H, 1H, 2H, 2H-heptadecafluorodecyl methacrylate, tetrahydroperfluoro acrylate, phenoxyethyl acrylate, phenoxyethyl methacrylate, bisphenol A acrylate, bisphenol A dimethacrylate, ethoxylated bisphenol A acrylate, ethoxylated bisphenol A methacrylate, hexafluoro bisphenol A diacrylate, hexafluoro bisphenol A dimethacrylate, diethylene glycol diacrylate, diethylene glycol dimethacrylate, dipropylene glycol diacrylate, dipropylene glycol dimethacrylate, polyethylene glycol diacrylate, polyethylene glycol dimethacrylate, polypropylene glycol diacrylate, polypropylene glycol dimethacrylate, trimethylolpropane triacrylate, trimethylolpropane trimethacrylate, ethoxylated trimethylolpropane triacrylate, ethoxylated trimethylolpropane trimethacrylate), pentaerythritol triacrylate, pentaerythritol trimethacrylate), pentaerythritol tetraacrylate, pentaerythritol tetramethacrylate, methyl-3-butenoate, allyl methyl carbonate, diallyl pyrocarbonate, allyl acetoacetate, diallyl carbonate, diallyl phthalate, dimethyl itaconate, diallyl carbonate, or combinations thereof. Other useful organic compounds include acrylate tipped polyurethane prepolymers prepared by reacting isocyanate reactive acrylate monomers, oligomers or polymers such as hydroxy acrylates with isocyanate functional prepolymers.

When an organosilicon compound is used as component (i), again the selected compound depends on the use of the cured product. Generally, it comprises organosilanes or organopolysiloxanes having on average at least one free radical polymerizable moiety. The organosilicon compound can be monomeric, oligomeric, polymeric, or it can be a mixture of monomers, and/or oligomers, and/or polymers. Higher molecular weight species of such free radical polymerizable compounds are often referred to in the art as macromonomers. The organosilicon compounds can contain mono-functional or multi-functional units in the free radical polymerizable group. This allows for its polymerization to linear polymers, branched polymers of various architecture, copolymers of various architecture, or crosslinked polymeric networks. The monomers and oligomers can be any monomer or oligomer normally used to prepare addition or condensation curable polymers, or they can be monomers or oligomers used in other types of curing reactions, provided they contain at least one free radical polymerizable group.

Suitable organosilicon monomers include compounds having a structure generally corresponding to the formula $R''_nSi(OR''')_{4-n}$, where n is 0-4; and where at least one of the R" or R''' groups contains a free radical polymerizable group. The R" and R''' groups can be independently, hydrogen; a halogen atom; or an organic group including alkyl groups, haloalkyl groups, alkenyl groups, alkynyl groups, acrylate functional groups, and methacrylate functional groups. The R" and R''' groups may also contain other organic functional groups including glycidyl groups, amine groups, ether groups, cyanate ester groups, isocyano groups, ester groups, carboxylic acid groups, carboxylate salt groups, succinate groups, anhydride groups, mercapto groups, sulfide groups, azide groups, phosphonate groups, phosphine groups, masked isocyano groups, and hydroxyl groups.

Representative examples of free radical polymerizable organosilicon monomers include compounds such as 3-methacryloxypropyltrimethoxysilane, 3-methacryloxypropyltriethoxysilane, 3-acryloxypropyltrimethoxysilane, 3-methacryloxypropyltrimethylsilane, 3-acryloxypropyltriethoxysilane, 3-acryloxylpropyltrimethylsilane, vinyltrimethoxysilane, allyltrimethoxysilane, 1-hexenyltrimethoxysilane, tetra-(allyloxysilane), tetra-(3-butenyl-1-oxy)silane, tri-(3-butenyl-1-oxy)methylsilane, di-(3-butenyl-1-oxy)dimethylsilane, and 3-butenyl-1-oxy trimethylsilane. The preferred free radical polymerizable moieties for these organosilicon compounds are aliphatic unsaturated groups in which the double bond is located at the terminal positions, internal positions, or both positions relative to the functional group. The most preferred free radical polymerizable moiety for the organosilicon compounds are acrylate groups or methacrylate groups.

When the free radical polymerizable organosilicon component is a monomer, oligomer, or polymer, the compound can be an organopolysiloxane having a linear, branched, hyperbranched, or resinous structure. The compound can be homopolymeric or copolymeric. The free radical polymerizable moiety for the organopolysiloxane can be an unsaturated organic group such as an alkenyl group having 2-12 carbon atoms, exemplified by the vinyl group, allyl group, butenyl group, or the hexenyl group. The unsaturated organic group can also comprise alkynyl groups having 2-12 carbon atoms, exemplified by the ethynyl group, propynyl group, or the butynyl group. The unsaturated organic group can bear the free radical polymerizable group on an oligomeric or polymeric polyether moiety such as an allyloxypoly(oxyalkylene) group or a halogen substituted analog thereof. The free radical polymerizable organic group can contain acrylate functional groups or methacrylate functional groups, exemplified by acryloxyalkyl groups such as acryloxypropyl groups and methacryloxyalkyl groups such as the methacryloxypropyl group. The unsaturated organic groups can be located at the terminal positions, pendant positions, or both the terminal and pendant positions relative to the polymer backbone. The preferred free radical polymerizable moiety for monomeric, oligomeric, and polymeric organosilicon compounds are acrylate groups and methacrylate groups.

Any remaining silicon bonded organic groups can be monovalent organic groups free of aliphatic unsaturation. The monovalent organic group can have 1-20 carbon atoms, preferably 1-10 carbon atoms, and is exemplified by alkyl groups such as methyl, ethyl, propyl, pentyl, octyl, undecyl, and octadecyl; cycloalkyl groups such as cyclohexyl; aryl groups such as phenyl, tolyl, xylyl, benzyl, and 2-phenylethyl; alkyloxypoly(oxylalkylene) groups such as propyloxypoly(oxyethylene), propyloxypoly(oxypropylene), propyloxy-poly(oxypropylene)-co-poly(oxyethylene) groups, halogen substituted analogs thereof; cyanofunctional groups including cyanoalkyl groups such as cyanoethyl and cyanopropyl; and halogenated hydrocarbon groups such as 3,3,3-trifluoropropyl, 3-chloropropyl, dichlorophenyl, and 6,6,6,5,5,4,4,3,3-nonafluorohexyl.

The free radical polymerizable organosilicon compound can vary in consistency from a fluid having a viscosity of 0.001 Pa·s at 25° C. to a gum. The free radical polymerizable organosilicon compound can also be a solid that becomes flowable at an elevated temperature or by the application of shear.

Component (i) includes organopolysiloxane fluids having the formulae:

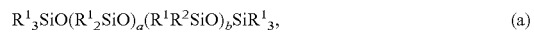  (a)

  (b)

combinations of such fluids.  (c)

In Formula (a), a has an average value of zero to 20,000, b has an average value of 1-20,000, c has an average value of zero to 20,000, and d has an average value of zero to 20,000. Each $R^1$ group is independently a monovalent organic group. The $R^2$ group is independently an unsaturated monovalent organic group. The $R^3$ groups can be the same as the $R^1$ groups. Each $R^4$ is independently an unsaturated organic group.

Suitable $R^1$ groups are monovalent organic groups including acrylic functional groups such as acryloyloxypropyl groups and methacryloyloxypropyl groups; alkyl groups such as methyl, ethyl, propyl, and butyl groups; alkenyl groups such as vinyl, allyl, and butenyl groups; alkynyl groups such as ethynyl and propynyl groups; aromatic groups such as phenyl, tolyl, and xylyl groups; cyanoalkyl groups such as cyanoethyl and cyanopropyl groups; halogenated hydrocarbon groups such as 3,3,3-trifluoropropyl, 3-chloropropyl, dichlorophenyl, and 6,6,6,5,5,4,4,3,3-nonafluorohexyl groups; alkenyloxypoly(oxyalkyene) groups such as allyloxy (polyoxyethylene), allyloxypoly(oxypropylene), and allyloxy-poly(oxypropylene)-co-poly(oxyethylene) groups; alkyloxypoly(oxyalkyene) groups such as propyloxy(polyoxyethylene), propyloxypoly(oxypropylene), and propyloxy-poly(oxypropylene)-co-poly(oxyethylene) groups; halogen substituted alkyloxypoly(oxyalkyene) groups such as perfluoropropyloxy(polyoxyethylene), perfluoropropyloxypoly(oxypropylene), and perfluoropropyloxy-poly(oxypropylene)-co-poly(oxyethylene) groups; alkoxy groups such as methoxy, ethoxy, n-propoxy, isopropoxy, n-butoxy, and ethylhexyloxy groups; aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups; epoxyalkyl groups such as 3-glycidoxypropyl, 2-(3,4,-epoxycyclohexyl)ethyl, and 5,6-epoxyhexyl groups; ester functional groups such as acetoxymethyl and benzoyloxypropyl groups; hydroxy functional groups such as hydroxy and 2-hydroxyethyl groups; isocyanate and masked isocyanate functional groups such as 3-isocyanatopropyl, tris-3-propylisocyanurate, propyl-t-butylcarbamate, and propylethylcarbamate groups; aldehyde functional groups such as undecanal and butyraldehyde groups; anhydride functional groups such as 3-propyl succinic anhydride and 3-propyl maleic anhydride groups; carboxylic acid functional groups such as 3-carboxypropyl and 2-carboxyethyl groups; and metal salts of carboxylic acids such as the zinc, sodium, or potassium salts of 3-carboxypropyl and 2-carboxyethyl.

The $R^2$ group is exemplified by alkenyl groups such as vinyl, allyl, and butenyl groups; alkynyl groups such as ethynyl and propynyl groups; and acrylic functional groups such as acryloyloxypropyl and methacryloyloxypropyl groups. As noted, the $R^3$ groups can be the same as the $R^1$ groups. The $R^4$ group is exemplified by alkenyl groups such as vinyl, allyl, and butenyl groups; alkynyl groups such as ethynyl and propynyl groups; alkenyloxypoly(oxyalkyene) groups such as allyloxy(polyoxyethylene), allyloxypoly(oxypropylene), and allyloxy-poly(oxypropylene)-co-poly(oxyethylene) groups; and acrylic functional groups such as acryloyloxypropyl and methacryloyloxypropyl groups.

Some representative organopolysiloxane fluids suitable for use as component (i) include α,ω-methacryloxypropyl-dimethylsilyl terminated polydimethylsiloxanes; α,ω-acryloxypropyl-dimethylsilyl terminated polydimethylsiloxanes; pendant acrylate functional polymers and methacrylate functional polymers such as poly(acryloxypropyl-methylsiloxy)-polydimethylsiloxane copolymers and poly(methacryloxypropyl-methylsiloxy)-polydimethylsiloxane copolymers; and telechelic polydimethylsiloxanes having multiple acrylate functional groups or methacrylate functional groups such as compositions formed via Michael addition of multi-acrylate monomers or multi-methacrylate monomers to amine terminated polydimethylsiloxanes. Such functionalizing reactions can be carried out a priori or in-situ.

It may be desirable to use a mixture of organopolysiloxane fluids differing in their degree of functionality and/or the nature of the free radical polymerizable group. For example, a much faster crosslinking efficiency and a reduced sol content can be obtained by using a tetra-functional telechelic polydimethylsiloxane prepared by the Michael addition reaction of N-(methyl)isobutyl-dimethylsilyl terminated polydimethylsiloxane with two molar equivalents of trimethylolpropane tri-acrylate as component (i) of the composition, relative to di-functional methacryloxypropyl-dimethylsilyl terminated polydimethylsiloxanes having a similar degree of polymerization (DP). However, the latter compositions allow produce lower modulus elastomeric particles. Hence, combinations of two compositions may be quite useful. Methods for preparing such organopolysiloxane fluids are known and include the hydrolysis and condensation of the corresponding organohalosilanes or the equilibration of cyclic polydiorganosiloxanes.

Component (i) can be an organosiloxane resin including MQ resins containing $R^5_3SiO_{1/2}$ units and $SiO_{4/2}$ units; TD resins containing $R^5SiO_{3/2}$ units and $R^5_2SiO_{2/2}$ units; MT resins containing $R^5_3SiO_{1/2}$ units and $R^5SiO_{3/2}$ units; MTD resins containing $R^5_3SiO_{1/2}$ units, $R^5SiO_{3/2}$ units, and $R^5_2SiO_{2/2}$ units; or combinations thereof. Each $R^5$ group in these organosiloxane resins represents a monovalent organic group. The monovalent organic group $R^5$ can have 1-20 carbon atoms, preferably 1-10 carbon atoms.

Some examples of suitable monovalent organic groups representative of the $R^5$ group include acrylate functional groups such as acryloxyalkyl groups; methacrylate functional groups such as methacryloxyalkyl groups; cyanofunctional groups; and monovalent hydrocarbon groups. Monovalent hydrocarbon groups include alkyl groups such as methyl, ethyl, propyl, pentyl, octyl, undecyl, and octadecyl groups; cycloalkyl groups such as cyclohexyl groups; alkenyl groups such as vinyl, allyl, butenyl, and hexenyl groups; alkynyl groups such as ethynyl, propynyl, and butynyl groups; aryl groups such as phenyl, tolyl, xylyl, benzyl, and 2-phenylethyl groups; halogenated hydrocarbon groups such as 3,3,3-trifluoropropyl, 3-chloropropyl, dichlorophenyl, and 6,6,6,5,5,4,4,3,3-nonafluorohexyl groups; and cyano-functional groups including cyanoalkyl groups such as cyanoethyl and cyanopropyl groups.

The $R^5$ group can also comprise an alkyloxypoly(oxyalkyene) group such as propyloxy(polyoxyethylene), propyloxypoly(oxypropylene) and propyloxy-poly(oxypropylene)-co-poly(oxyethylene) groups; halogen substituted alkyloxypoly(oxyalkyene) groups such as perfluoropropyloxy(polyoxyethylene), perfluoropropyloxypoly(oxypropylene) and perfluoropropyloxy-poly(oxypropylene)-co-poly(oxyethylene) groups; alkenyloxypoly(oxyalkyene) groups such as allyloxypoly(oxyethylene), allyloxypoly(oxypropylene) and allyloxy-poly(oxypropylene)-co-poly(oxyethylene) groups; alkoxy groups such as methoxy, ethoxy, n-propoxy, isopropoxy, n-butoxy and ethylhexyloxy groups; aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups; hindered aminoalkyl groups such as tetramethylpiperidinyl oxypropyl groups; epoxyalkyl groups such as 3-glycidoxypropyl, 2-(3,4,-epoxycyclohexyl)ethyl, and 5,6-epoxyhexyl groups; ester functional groups such as acetoxymethyl and benzoyloxypropyl groups; hydroxy functional groups such as hydroxy and 2-hydroxyethyl groups; isocyanate and masked isocyanate functional groups such as 3-isocyanatopropyl, tris-3-propylisocyanurate, propyl-t-butylcarbamate, and propylethylcarbamate groups; aldehyde functional groups such as undecanal and butyraldehyde groups; anhydride functional groups such as 3-propyl succinic anhydride and 3-propyl maleic anhydride groups; carboxylic acid functional groups such as 3-carboxypropyl, 2-carboxyethyl, and 10-carboxydecyl groups; and metal salts of carboxylic acids such as zinc, sodium, and potassium salts of 3-carboxypropyl and 2-carboxyethyl.

The organosiloxane resin can contain an average of 1-40 mole percent of free radical polymerizable groups such as unsaturated organic groups. The unsaturated organic groups may be an alkenyl group, alkynyl group, acrylate-functional group, methacrylate-functional group, or a combination of such groups. The mole percent of unsaturated organic groups in the organosiloxane resin is considered herein to be the ratio of (i) the number of moles of unsaturated groups containing siloxane units in the resin, to (ii) the total number of moles of siloxane units in the resin, times a factor of 100. Some specific examples of suitable organosiloxane resins that are useful as component (i) are $M^{Methacryloxypropyl}Q$ resins, $MT^{Methacryloxypropyl}T$ resins, $MDT^{Methacryloxypropyl}T^{Phenyl}T$ resins, and $M^{Vinyl}T^{Phenyl}$ resins, where M, D, T, and Q have the same meanings as defined above.

Methods of preparing such organosiloxane resins are known including resins made by treating a resin copolymer produced by a silica hydrosol capping process, with an alkenyl containing endblocking reagent, as described in U.S. Pat.

No. 2,676,182 (Apr. 20, 1954). This method involves reacting a silica hydrosol under acidic conditions with a hydrolyzable triorganosilane such as trimethylchlorosilane, a siloxane such as hexamethyldisiloxane, or a mixture thereof, followed by recovery of a copolymer having M and Q units. The copolymer typically contains about 2-5 percent by weight of hydroxyl groups. Organosiloxane resins containing less than 2 percent by weight of silicon bonded hydroxyl groups may then be prepared by reacting the copolymer with an endblocking agent containing unsaturated organic groups, and with an endblocking agent free of aliphatic unsaturation, in an amount sufficient to provide 3-30 mole percent of unsaturated organic groups in the product. Some suitable endblocking agents include silazanes, siloxanes, and silanes; and preferred endblocking agents are described in U.S. Pat. No. 4,584,355 (Apr. 22, 1986), U.S. Pat. No. 4,585,836 (Apr. 29, 1986), and U.S. Pat. No. 4,591,622 (May 22, 1986). A single endblocking agent or a mixture of endblocking agents may be used to prepare such organosiloxane resins.

Another type of organosilicon compound that can be used as component (i) is a composition formed by copolymerizing an organic compound having a polymeric backbone, with an organopolysiloxane, where an average of at least one free radical polymerizable group is incorporated per molecule. Some suitable organic compounds include hydrocarbon based polymers such as polyisobutylene, polybutadienes, and polyisoprenes; polyolefins such as polyethylene, polypropylene and polyethylene polypropylene copolymers; polystyrenes; styrene butadiene; and acrylonitrile butadiene styrene; polyacrylates; polyethers such as polyethylene oxide or polypropylene oxide; polyesters such as polyethylene terephthalate or polybutylene terephthalate; polyamides; polycarbonates; polyimides; polyureas; polymethacrylates; and partially fluorinated or perfluorinated polymers such as polytetrafluoroethylene; fluorinated rubbers; terminally unsaturated hydrocarbons; olefins; and polyolefins. The organic compound can be a copolymer of any of these polymers, including polymers containing multiple organic functionality, multiple organopolysiloxane functionality, or combinations of organopolysiloxanes and organic compounds. The copolymeric structures can vary in the arrangement of repeating units from random, grafted, to being blocky in nature.

Component (i), in addition to bearing on average at least one free radical polymerizable group, may have a physical transition temperature, bear an organofunctional group with a physical transition temperature, or upon polymerization or crosslinking form particles that have a physical transition temperature, i.e., glass transition or melting transition, such that the composition undergoes changes marked by a softening or non-linear reduction in its viscosity on reaching certain temperatures under the conditions of use. Such materials are particularly useful for encapsulation of actives that are released by the introduction of heat. For example, an organopolysiloxane-based version of component (i) may be an organofunctional silicone wax. The wax can be an uncrosslinked organofunctional silicone wax, a crosslinked organofunctional silicone wax, or a combination of waxes. Silicone waxes such as these are commercially available and are described in U.S. Pat. No. 6,620,515 (Sep. 16, 2003). When the organofunctional silicone wax bears at least one free radical polymerizable group such as an acrylate or methacrylate group, the wax is useful to impart phase changes when used as component (i). Component (i) can also comprise a mixture of any of the organic compounds, organosilicon compounds, and/or organopolysiloxane compounds described above.

The Organoborane Amine Complex (ii)

The organoborane amine complex (ii) is a complex formed between an organoborane, and a suitable amine compound that renders the complex stable at ambient conditions. The complex (ii) should be capable of initiating polymerization or crosslinking of component (i) by the introduction of an amine reactive compound and/or by heating. An example is an alkylborane amine complex formed from trialkylboranes and various amine compounds. Examples of trialkylboranes useful for forming component (ii) include trialkylboranes of the formula $BR''_3$ where R'' represents linear and branched aliphatic or aromatic hydrocarbon groups containing 1-20 carbon atoms. Some examples include trimethylborane, tri-n-butylborane, tri-n-octylborane, tri-sec-butylborane, tridodecylborane, and phenyldiethylborane.

Also useful as the organoborane component of the organoborane-amine complexes are a class of organosilicon functional boron compounds described in copending US patent application filed on Jan. 4, 2005, entitled "Organosilicon Functional Boron Amine Catalyst Complexes and Curable Compositions Made Therefrom", and assigned to the same assignee as the present application. Generally, these compounds consist of a complex having an organosilicon functional organoborane portion containing at least one silicon atom, and the silicon atom is present in the organosilicon functional organoborane portion of the complex as a silicon atom containing group, a siloxane oligomer containing group, or as a siloxane polymer containing group. As set forth in the copending application, the organosilicon functional boron amine catalyst complexes therein are compounds having a formula:

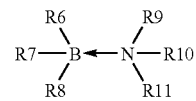

wherein B represents boron; R6, R7, and R8 are groups independently selected from the group consisting of hydrogen; a cycloalkyl group; a linear or branched alkyl group having 1-12 carbon atoms on the backbone; an alkylaryl group; an organosilane group; an organosiloxane group; an alkylene group capable of functioning as a covalent bridge to a boron atom; a divalent organosiloxane group capable of functioning as a covalent bridge to a boron atom; and halogen substituted homologues thereof; with the provisos that at least one of the R6, R7, or R8 groups contains one or more silicon atoms, and the silicon-containing group is covalently bonded to boron; R9, R10, and R11 are a group that yields an amine compound or a polyamine compound capable of complexing boron; and wherein two or more of the R6, R7, or R8 groups, and two or more of the R9, R10, or R11 groups, are such that they can combine to form heterocyclic structures, provided the sum of the number of atoms from the two combining groups does not exceed 11. Reference may be had to the copending application for additional detail if necessary.

Some examples of amine compounds useful to form the organoborane amine complex (ii) with the organoborane compounds include 1,3 propane diamine, 1,6-hexanediamine, methoxypropylamine, pyridine, and isophorone diamine. Other examples of amine compounds useful to form organoborane amine complexes are described in U.S. Pat. No. 6,777,512 (Aug. 17, 2004), as well as in U.S. Pat. No. 6,806,330 (Oct. 19, 2004).

Silicon containing amine compounds can also be used to form the organoborane amine complex including compositions such as 3-aminopropyltrimethoxysilane, 3-aminopropyltriethoxysilane, 2-(trimethoxysilylethyl)pyridine, aminopropylsilanetriol, 3-(m-aminophenoxy) propyltrimethoxysilane, 3-aminopropyldiisopropylmethoxysilane, aminophenyltrimethoxysilane, 3-aminopropyltris(methoxyethoxyethoxy)silane, N-(2-aminoethyl)-3-aminopropyltrimethoxysilane, N-(6-aminohexyl)aminomethyltrimethoxysilane, N-(2-aminoethyl)-11-aminoundecyltrimethoxysilane, (aminoethylaminomethyl)phenethyltrimethoxysilane, N-(2-aminoethyl)-3-aminopropylmethyldimethoxysilane, N-(2-aminoethyl)-3-aminoisobutylmethyldimethoxysilane, and (3-trimethoxysilylpropyl)diethylene-triamine.

Amine functional organopolysiloxanes are also useful for forming the organoborane amine complex (ii) including compounds described above in formulas (a) and (b), and those compounds described previously as organopolysiloxane resins. This is subject to the stipulation that the molecule contain at least one amine functional group, such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole.

Also useful to form the organoborane amine complex (ii) are other nitrogen containing compounds including N-(3-triethyoxysilylpropyl)-4,5-dihydroimidazole, ureidopropyltriethoxysilane, siloxanes of formulas similar to formulas (a) and (b) noted above, and those compounds described previously as organopolysiloxane resins in which at least one group is an imidazole, amidine, or ureido functional group. When the amine compound is polymeric, the molecular weight is not limited, except that it should be such as to maintain a sufficiently high concentration of boron to permit polymerization of the composition. For example, in a two-part composition, the part containing the organoborane initiator may be diluted with the monomer and optionally, the active ingredient to be encapsulated, or it may consist of the initiator complex alone.

If desired, the composition may be stabilized by physically or chemically attaching the organoborane amine complex to solid particles. This provides a way to control reaction times, as well as to stabilize liquid phase organoborane amine complexes against grossly separating from the rest of the composition during storage. For example, chemical attachment can be performed by pretreating solid particles such as ground silica, precipitated silica, calcium carbonate, or barium sulfate, with a condensation reactive compound containing an amine group such as aminopropyltrimethoxysilane. The pretreatment is followed by complexation with an organoborane compound, or by the direct treatment of the solid particles using a preformed organoborane amine complex that is condensation reactive. When the solid particles contain surface functional groups, additives such as surface treating agents or impurities that are inherently amine reactive, require appropriate pre-cautions to avoid premature decomplexation of the organoborane amine complex being attached. Solid particles containing amine reactive substances can be purified or neutralized before attachment of the organoborane amine complex. Alternatively, the attachment of the organoborane amine complex can be performed in an oxygen free environment.

The Poor or Non-Solvent for the Polymerization Product (iii)

Component (iii) is a poor or non-solvent for the polymerization product of component (i) and any other component in the system capable of co-polymerizing with component (i). Component (iii) may be aqueous or non-aqueous. A poor solvent as used herein is intended to mean that the polymerization product is not substantially soluble at the reaction temperature in component (iii). A non-solvent as used herein is intended to mean that the polymerization product is not soluble at the reaction temperature in component (iii).

Component (iii) may be a single fluid or a mixture of one or more different kinds of fluids. Prior to polymerization of the composition, the solubility characteristics of component (iii) are not restricted relative to the rest of the composition, i.e. the other components may be miscible, partially miscible, or immiscible in component (iii). It is preferred that component (i) be at least partially soluble in component (iii), or that component (i) be compatibilized by the presence of a separate stabilizing agent. Otherwise, intensive mechanical agitation of the composition may be needed, to obtain uniform initial dispersion of the droplets.

While the amount of component (iii) is not necessarily limited, for practical purposes, it is preferred that the combined concentration of the other components in the solvent, be low enough to allow the formation of discrete particles, without excessive aggregation of the primary particles. For example, it is preferred that component (iii) be present in an amount of 25 volume percent or greater of the total volume of the composition, more preferably 50 volume percent or greater, at the conditions of reaction.

Some examples of component (iii) include water; polar and non-polar organic solvents; organosilanes; linear and cyclic organosiloxane fluids, oligomers, resins, and polymers; and the so called "green solvents", i.e., ecologically friendly solvents, such as ionic liquids and supercritical fluids. Poor or non-solvents for many polymer systems are known, and can be found, for example, in many standard polymer handbooks such as the Polymer Handbook, Third Edition, Edited by J. Brandrup and E. H. Immergut, John Wiley & Sons, Pages VII/379-382+, (1989). Some examples of "green solvents" from which the poor or non-solvents can be selected for various polymers include ionic liquids such as immidazoleum derivatives such as 1-ethyl-3-methylimidazolium tosylate, 1-ethyl-3-methylimidazolium tetrafluoroborate, 1-methyl-3-octylimidazolium chloride, 1-butyl-3-methylimidazolium hexafluorophosphate; and pyridinium derivatives such as 1-butyl-4-methylpyridinium chloride, 1-butyl-4-methylpyridinium hexafluorophosphate, 1-butyl-4-methylpyridinium tetrafluoroborate. Supercritical fluids that can be used as component (iii) include supercritical carbon dioxide, supercritical water, supercritical ethane, supercritical nitrous oxide, supercritical ammonia, supercritical 1,1,1,2-tetrafluoroethane, supercritical difluoromethane, supercritical pentafluoroethane, and mixtures thereof. The solvent strength of supercritical fluids may also be modified by any number of co-solvents such as methanol, ethanol, acetone, hexane, or benzene.

For instance, for the polymerization of monomers such as methyl methacrylate, examples of component (iii) include hexane, cyclohexane, heptane, hexamethyldisiloxane, octamethyltrisiloxane, octamethylcyclotetrasiloxane, decamethylcyclopentasiloxane, decamethyltetrasiloxane, or a mixture thereof. For the polymerization of siloxane monomers or organopolysiloxane macromonomers, examples of component (iii) include acetone, dichloroethane, cyclohexanone, acetonitrile, methanol, and water. It is preferred that the poor or non-solvent be non-toxic. Where the microparticles must be separated in a neat form, it is also preferred that component (i) have a sufficiently low boiling point, to be readily removed at temperatures below a physical transition temperature, such as the glass transition temperature, of the polymerized product. In some cases, component (iii) can be the carrier for delivery into a subsequent use, such as when a silicone polymer acting as component (iii) in which the microparticles have been formed, is added to a silicone elastomer formulation, thereby obviating the need for removal of component (iii) after the polymerization of the particles.

The Amine Reactive Compound Having Amine Reactive Groups (iv)

The polymerizable composition may contain an amine reactive compound (iv) that is capable of initiating the polymerization or crosslinking when mixed with the organoborane amine complex (ii) and exposed to an oxygenated environment. The presence of component (iv) allows the initiation of polymerization or crosslinking to occur rapidly at temperatures below the dissociation temperature of the organoborane amine complex (ii), including room temperature and below. To prevent pre-mature polymerization in the presence of oxygen, it is preferred that components (ii) and (iv) be physically or chemically isolated, until just prior to the time when it is desirable to initiate the polymerization. For example, the composition may be prepared initially as two separate solutions that are combined into one, just prior to the initiation of polymerization. The remaining components of the composition may be distributed in any manner between the two solutions, as long as (ii) and (iv) do not contact each other.

For example, a first solution comprising components (i) and (ii), and a second solution comprising components (iii) and (iv) are air stable, but polymerize to form fine particles when the solutions are mixed together in air. Alternatively, components (ii) and (iv) or both can be encapsulated, or delivered in separate phases. This can be accomplished by introducing one or both of the components (ii) and (iv) in a solid form, that prevents intimate mixing of components (ii) and (iv). Polymerization of the composition can be activated by (a) heating it above the softening temperature of the solid phase component or encapsulant, or (b) by the introduction of a solubilizing agent for the solid phase, that allows mixing of components (ii) and (iv). Components (ii) and (iv) can also be combined in a single container without significant polymerization, by packaging the two components in a container where mixing conditions are anaerobic. In this case, polymerization can be initiated by introduction of oxygen to the composition.

Examples of some amine reactive compounds having amine reactive groups (iv) that can rapidly initiate polymerization or crosslinking of particles in the presence of oxygen, include mineral acids, Lewis acids, carboxylic acids, carboxylic acid derivatives such as anhydrides and succinates, carboxylic acid metal salts, isocyanates, aldehydes, epoxides, acid chlorides, and sulphonyl chlorides. Some suitable amine reactive compounds include acrylic acid, methacrylic acid, methacrylic anhydride, undecylenic acid, oleic acid, isophorone diisocyanate monomers or oligomers, methacryloylisocyanate, 2-(methacryloyloxy)ethyl acetoacetate, undecylenic aldehyde, and dodecyl succinic anhydride.

The amine reactive compound be an organosilane or organopolysiloxane bearing amine reactive groups. Some examples include 3-isocyanatopropyltrimethoxysilane; 3-glycidoxypropyltrimethoxysilane; propylsuccinic anhydride functionalized linear, branched, resinous, and hyperbranched organopolysiloxanes; cyclohexenyl anhydride functional linear, branched, resinous, and hyperbranched organopolysiloxanes; carboxylic acid functionalized linear, branched, resinous, and hyperbranched organopolysiloxanes such as carboxydecyl terminated oligomeric or polymeric polydimethylsiloxanes; and aldehyde functionalized linear, branched, resinous, and hyperbranched organopolysiloxanes such as undecylenic aldehyde-terminated oligomeric or polymeric polydimethylsiloxanes.

The '512 patent describes silicon containing compounds that can be used including certain compounds that release an acid when exposed to moisture. The '512 patent also describes other amine reactive compounds referred to as decomplexation agents.

Other compounds that can be used include compounds capable of generating amine reactive groups when exposed to ultraviolet radiation such as a photoacid generator. Some examples of such compounds include iodonium salts containing $[SbF_6]^-$ counterions. In such an embodiment, it may be useful to optionally include a photosensitizing compound such as isopropylthioxanthone.

In some cases, it may be desirable to control the rate of polymerization, or the location, i.e., nucleation, of particle formation, by attaching the amine reactive compound to solid particles. The solid particles may have properties such as conductivity or ferroelectric properties that can render the resulting particulate polymerization products in which the solid particles are encapsulated in the polymer shell, more useful for subsequent applications, than prior to encapsulation by this method. Attachment of the amine-reactive groups can be accomplished by a number of known surface treatments either in-situ or a priori. Some surface treatment methods include, for example, pre-treating solid particles such as ground or precipitated silica, calcium carbonate, carbon black, carbon nanoparticles, silicon nanoparticles, barium sulfate, titanium dioxide, aluminum oxide, boron nitride, silver, gold, platinum, palladium, and alloys thereof; or a base metal such as nickel, aluminum, copper, and steel; with a condensation reactive compound. This is followed by reaction of the pre-treated solid particles with a compound having amine reactive groups, or by the direct treatment of the pre-treated solid particles using amine reactive compounds that have hydrolyzable moieties. In such cases, it is preferred that the particles to which the amine reactive compounds are attached have a similar density to the polymerization medium to facilitate dispersion of the particles in the composition.

Some examples of condensation reactive compounds that can be used for attachment, include isocyanatopropyltriethoxysilane, triethoxysilylundecanal, glycidoxypropyltrimethoxysilane, 3-(triethoxysilyl)propylsuccinic anhydride, and 2-(4-chlorosulfonylphenyl)ethyltrimethoxysilane. Attachment of the amine reactive compound to the solid particles can also be accomplished by mixing an acid functional compound with fillers having the appropriate surface functionality, under conditions conducive to formation of an acid base complex, a hydrogen bonded complex, or an acid salt.

Some particulate fillers are commercially available that are pre-treated with surface treating agents referred to as lubricants, or that can be obtained with impurities that contain amine reactive groups, such as carboxylic acid. In this way, component (iv) and an active component (v) or an optional component (vi), can be delivered together in the form of a treated filler. The advantage obtained in that instance, is that the reaction between the organoborane amine complex and the amine reactive groups on the filler, can help remove the lubricant from the surface of the filler particles. The lubricant is necessary for stability of the particle in concentrated form, but it can interfere with the intended function of the filler. The reaction of component (ii) and the amine-reactive lubricant can effectively remove the lubricant from the particle surface, thereby activating the particle. A typical example is a fatty-acid treated silver filler particle, wherein the fatty acid lubricant interferes with particle-to-particle contact that is needed for establishing electrical conductivity in a final form.

It may also be advantageous for the sake of stability, to use a combination of fillers containing amine reactive groups, and fillers that are inert with respect to amine compounds. For example, when components (ii) and (iv) are maintained in separate solutions, the filler that is inert with respect to amine compounds, can be combined with the alkylborane amine complex (ii), while the filler bearing amine reactive groups, can be packaged in a separate container from component (ii). In that case, component (i) could be included with either part of the formulation, or with both parts. Alternatively, the amine reactive compound (iv) can be introduced under conditions that allow it to be delivered in the gas phase to the reaction vessel containing the remainder of the composition. In some cases, if the amine reactive compound is also a poor or non-solvent for the system, component (iii) and component (iv) may be the same. In such cases, it is preferred that the amine reactive compound be easy to remove by methods such as evaporation or sublimation, since a larger excess of the amine reactive compound is used.

The Active Component (v)

Active components (v) that may be added to the composition for encapsulation by the polymerized particles include vitamins, pharmaceutical agents, bacteria, viruses, solvents, fertilizers herbicides pesticides and other agricultural chemicals, cure catalysts, adhesion promoters, crosslinkers not containing free radical polymerizable groups, monomers or reactants for compositions curable by a mechanism other than free radical polymerization, solid particles, conductive solid particles, magnetic solid particles, dielectric solid particles, absorbing particles, pigments, dyes, inks, flavors, fragrances, and water. Cosmetic, health care, and home care agents can also be encapsulated such as antiacne agents, anticaries agents, antidandruff agents, antifungal agents, antimicrobial agents, antioxidants, antiperspirants, deodorants, biocides, external analgesics, oral care agents, oral care drugs, oxidizing agents, reducing agents, skin bleaching agents, skin protectants, sunscreens, UV light absorbing agents, enzymes, optical brighteners, fabric softeners, and surfactants.

For example, active component (v) may comprise (a) vitamins such as vitamin A, vitamin B12, vitamin C, vitamin D, vitamin E, vitamin K, beta-carotene, lutein, and lycopene; (b) pharmaceutical agents such as aspirin, ibuprofen, epidemial growth factors, paclitaxel, tissue plasminogen factors, penicillin, bacitracin, and human growth hormones; (c) bacteria such as e-coli and *bacillus cereus*; (d) viruses such as influenza virus or tobacco mosaic virus; (e) solvents such as water, heptane, and ethanol; (f) fertilizers; (g) herbicides such as 2,4-D, chlorimuron, and fenoxaprop; (h) pesticides such as atrazine, diazinon, and chlorpyrifos; (i) insect repellents such as N,N-diethyl-meta-toluamide and pyrethrin; (j) catalysts such as tin, platinum, rhodium, palladium, titanium, zirconium, zinc, and organometallic complexes such as zirconium (IV) acetylacetonate, and versions thereof supported on solid particles such as zeolites; (k) adhesion promoters such as alkoxysilanes, and partially hydrolyzed or condensed oligomers thereof, titanates, alcohols, silazanes, chlorosilanes, fluorinated silanes, mercaptans, other sulfur compounds, and amines; (l) crosslinking or curing agents such as organohydrogen polysiloxanes, multifunctional amines, and isocyanates; (m) monomers curable by mechanisms other than free radical polymerization such as epoxies, urethanes, and polyols; (n) solid particles such as carbon, ground silica, precipitated silica, fused silica, quartz, barium sulfate, and calcium carbonate; (o) conductive particles such as gold, silver, indium, tin, copper, alumina, zinc, carbon black, and alloys thereof; (p) magnetic particles such as ferrite; (q) dielectric particles such as fused glass microspheres, titania, calcium carbonate, or polystyrene; (r) absorbing solid particles such as activated carbon or molecular sieves; (s) dyes, stains, and inks such as indigo and carbon black solutions; (t) flavors and flavoring compounds such as sugars, salts, acetaldehyde, lemon oil, pinacol, and cinnamaldehyde; (u) fragrances such as menthol, camphor, ylang ylang oil, and musk xylol; (v) cosmetic and healthcare agents such as salicylic acid, sulfur, zinc undecylenate, Poloxamer 188, cysteine, aluminum zirconium tetrachlorohydrex PEG, sodium bicarbonate, benzalkonium cetyl phosphate, benzyl alcohol, camphor, methyl salicylate, glycerin, potassium bromate, glyceryl thioglycolate, glyceryl monostearate, isopropyl palmitate, dimethicone, and lanolin; (w) dental agents such as sodium fluoride, sodium monofluorophosphate, and stannous fluoride; UV-protectors such as aminobenzoic acid, titanium dioxide, and ethylmethoxycinnamate; and (x) water in the forms of ice, distilled water, deionized water, acidified water, and basic water. When the active component is in a solid form at the conditions of encapsulation, its particle size, distribution, or shape is not limited. For example, carbon particles may range from activated carbon powders to nanoparticulates, such as carbon nanotubes or Buckminster Fullerne. By judicious selection of the other components in the system, the properties of the polymer microparticle may be controlled to allow a desirable mechanism of release of the active component (v). Examples of release mechanisms that allow the active component (v) to release from the shell at the desired rate include extraction, dissolution, melting, softening, abrading, or cracking via thermal or mechanical stress.

Optional Components (vi)

Some optional components that can also be included in the curable compositions herein include surfactants; emulsifiers; dispersants; polymeric stabilizers; crosslinking agents; combinations of polymers, crosslinking agents, and catalysts useful for providing a secondary polymerization or crosslinking of the particles; rheology modifiers such as thickeners; density modifiers; UV stabilizers; aziridine stabilizers; cure modifiers such as hydroquinone and hindered amines; free radical initiators such as organic peroxides and ozonides; polymers; diluents; acid acceptors; antioxidants; heat stabilizers; flame retardants; scavenging agents; silylating agents; foam stabilizers; solvents; diluents; plasticizers; and dessicants.

Processing

Polymeric particles herein can be prepared by forming a curable composition containing the following amounts of components (i)-(v):

A. 0.1-50 parts by weight of the free radical polymerizable organosilicon monomer, oligomer or polymer (i);

B. 0.1-50 parts by weight of the organoborane amine complex (ii), sufficient to cure the composition, the amount depending on the molecular weight of the complex and the number of boron atoms per molecule;

C. 0.50-10,000 parts by weight of the poor or non-solvent (iii) for the product of polymerization of the free radical polymerizable organosilicon monomer, oligomer or polymer (i);

D. 0 to 50 parts by weight of the amine reactive compound (iv);

E. 0 to 50 parts by weight of the active component (v) to be encapsulated by the product of polymerization (i); and F. 0 to 50 parts by weight of the optional ingredient(s); based on the total weight of the curable composition.

The polymerization rate of the curable composition of the invention can be controlled by introducing additional amine compounds, to increase the molar ratio of amine groups to boron atoms in the curable composition. The effective amount to be added, depends on the amine:boron ratio used in component (i). It is preferred that the overall amine:boron ratio remain sufficiently low, however, to permit polymerization to occur. A suitable amine:boron ratio would be less than 10:1, preferably less than 4:1. When the amine reactive component is already present in the composition, i.e., when residual carboxylic acid is present on the filler particles, higher levels of amine compounds should be added to neutralize or partially neutralize the amine reactive groups, to reduce the polymerization rate. The amine compound may contain monofunctional or multifunctional amine groups, and it can be a primary amine, a secondary amine, and/or a tertiary amine. If desired, the amine compound can contain free radical polymerizable groups, or another functional group such as a hydrolyzable group. The amine compound can be monomeric, oligomeric, or polymeric in nature. Amine groups on the compound may be borne on an organic, organosilicon, or organopolysiloxane compound.

The polymer particles can be prepared in a vessel suitable for polymerization by forming a curable composition containing components (i)-(iv), and any of the optional components (vi). The curable composition is agitated sufficiently to provide for a uniform dispersion of the components, and allowed to react to completion in air or an oxygen containing atmosphere, to form polymeric particles at lower temperatures than possible with existing methods, such as at room temperature or below, and at times less than possible with existing methods. For stability, components (ii) and (iv) should not be combined until just before polymerization is desired, unless oxygen is excluded from the atmosphere. Excellent shelf stability may be achieved by pre-mixing components (i) and (ii) along with any active component (v), then initiating microparticle polymerization by adding this pre-mix to a separate pre-mix containing components (iii) and (iv). Alternatively, component (i) and component (iv) may be pre-mixed, and then added to a mixture containing components (ii) and (iii) to form the microparticles. Also, component (iv) may be withheld and then dropped into a solution containing all of the remaining components. Further, all of the components may be mixed together in an oxygen-free atmosphere, and then polymerized by introducing an oxygenated gas. Optional components such as viscosity modifiers or dispersants can be pre-mixed with part containing component (ii) or component (iv). Typically, the reaction will proceed to completion within about 20 minutes, depending on the rate at which components (ii) and (iv) are mixed together.

The active component (v) can be encapsulated by the polymer particles by including it as a component in the curable composition, preferably in the part containing component (i). Certain combinations may be more convenient for a given system based upon compatibilities among the components, but the exact partitioning of the remaining components prior to mixing of all the components for particle polymerization, is not limited as long as components (ii) and (iv) are not combined in the presence of oxygen. Although the exact rate of addition is not critical to successful polymerization or encapsulation, for example, the pre-mixed catalyzed monomer solution can be dumped into the bath containing the poor or non-solvent, or it may be metered in slowly, the rate at which components (ii) and (iv) are combined, as well as the intensity of agitation in the reaction vessel, should be controlled for optimum reproducibility and control of particle size.

Similarly, the location at which the components are first combined, that is their point of introduction, can vary according to convenience and effectiveness for a given system. For example, a catalyzed pre-mix containing components (i), (ii) and (v) may be dropped into a vat containing components (iii) and (iv), the pre-mix may be introduced by a submerged inlet tube located below the liquid level line of the vessel containing the blend of components (iii) and (iv), or component (iv) may be introduced separately as a gas or as a liquid through a submerged feeding tube. If desired, the resulting polymer particles can be recovered by simply removing the poor or non-solvent (iii) and any other volatile components, by evaporation at a temperature sufficiently low to avoid subsequent fusing of the particles. If desired, the particles may first be purified and/or concentrated by separation steps such as washing and filtration. The process may be repeated a number of times with similar or different compositions if additional coverage of the encapsulated product is desired, provided the process is performed under conditions that avoid the premature release of the active component.

EXAMPLES

The following examples are set forth in order to illustrate the invention in more detail.

Example A1

Scanning Electron Microscopy—Micrographs

Dried polymer particles were characterized with a scanning electron microscope (SEM). A small amount of a sample was mounted on a SEM stub and coated with 15 nanometer sized platinum/palladium to promote conductivity while in the SEM. A JEOL JSM-6335 field emission SEM was used to capture digital images of the sample. The SEM was set at 5 kV and images, i.e., micrographs, were taken between 20× and 30,000× magnification. A JEOL JSM-6100 SEM along with a Noran Vantage energy dispersive spectroscopy (EDS) system was used to acquire elemental data. The SEM was set at 15 kv and spectra were collected for 60 seconds each on the surface of agglomerated particles.

In the following Comparative Examples 1-5 and Examples 1-13, all of the reactions were carried out at room temperature in a well ventilated laboratory hood. The active component (v) to be encapsulated in Examples 1-10 was zirconium (IV) acetylacetonate.

Comparative Example 1

In a 0.25 ounce polypropylene cup, 0.06 gram of zirconium (IV) acetylacetonate, was added to 1.00 gram of stearyl methacrylate, and 0.21 gram of 2,2'-azobis(2,4-dimethylpentanenitrile), i.e., Vazo® 52 low temperature polymerization initiator of E.I. du Pont de Nemours & Company, Wilmington Del. The solution was mixed for two 20 second cycles in a Hauschild rotary mixer. In a two ounce glass jar, 1.6 gram of acrylic acid was added to 16.1 gram of decamethyltetrasiloxane, and magnetically stirred at approximately 200-300 rpm. The monomer solution was dispensed by a disposable pipette over a time of approximately 10 seconds, into the continuously stirred contents of the glass jar. The resulting material showed no appreciable polymerization over 24 hours.

Comparative Example 2

In a 0.25 ounce polypropylene cup, 0.06 gram of zirconium (IV) acetylacetonate was added to 1.37 gram of methyl methacrylate, and 0.16 gram of 2,2'-azobis(2,4-dimethylpentanenitrile low temperature polymerization initiator. The solution was mixed for two 20 second cycles in a Hauschild rotary mixer. In a two ounce glass jar, 1.6 gram of acrylic acid was added to 16.0 gram of decamethyltetrasiloxane, and magnetically stirred at approximately 200-300 rpm. The monomer solution was dispensed by a disposable pipette over a time of approximately 10 seconds, into the continuously stirred contents of the glass jar. The resulting material showed no appreciable polymerization over 24 hours.

Comparative Example 3

In a 0.25 ounce polypropylene cup, 0.06 gram of zirconium (IV) acetylacetonate was added to 1.12 gram of methyl methacrylate, and 0.16 gram of benzoyl peroxide. The solution was mixed for two 20 second cycles in a Hauschild rotary mixer. In a two ounce glass jar, 1.5 gram of acrylic acid was added to 15.3 gram of decamethyltetrasiloxane, and magnetically stirred at approximately 200-300 rpm. The monomer solution was dispensed by a disposable pipette over a time of approximately 10 seconds, into the continuously stirred contents of the glass jar. The resulting material showed formation of a small amount of material that formed a film at the base of the jar, but no appreciable high molecular polymer products were formed over 24 hours.

Comparative Example 4

In a 0.25 ounce polypropylene cup, 0.06 gram of zirconium (IV) acetylacetonate was added to 1.01 gram of methyl methacrylate, and 0.16 gram of t-butyl peroxide. The solution was mixed for two 20 second cycles in a Hauschild rotary mixer. In a two ounce glass jar, 1.6 gram of acrylic acid was added to 16.0 gram of decamethyltetrasiloxane, and magnetically stirred at approximately 200-300 rpm. The monomer solution was dispensed by a disposable pipette over a time of approximately 10 seconds, into the continuously stirred contents of the glass jar. The resulting product showed formation of a small amount of material that formed a film at the base of the jar, but no appreciable high molecular polymer products were formed over 24 hours.

Comparative Example 5

In a 0.25 ounce polypropylene cup, and 0.15 gram of a catalyst comprising triethylborane complexed with an equimolar amount of 1,3-propanediamine, was added to a mixture containing 0.25 gram of zirconium (IV) acetylacetonate and mixed with 0.75 gram of stearyl methacrylate. The solution was mixed for 20 second in a Hauschild rotary mixer. In a two ounce glass jar, 1.6 gram of acrylic acid was added and stirred with a magnetic stirrer at approximately 200-300 rpm. The monomer solution was dispensed by a disposable pipette over a time of approximately 10 seconds, into the continuously stirred contents of the glass jar. Immediately, a yellowish monolithic polymerized disc conforming to the bottom of the container was formed with much heat generation. Comparative Example 5 is similar to Example 2 below with the exception that tetramethyldisiloxane which acts as component (iii) was omitted. This comparative example demonstrates that a poor or non-solvent component (iii) is essential to the production of polymer particles.

Example 1

In a 0.25 ounce polypropylene cup, 0.06 gram of zirconium (IV) acetylacetonate was added to 1.0 gram of stearyl methacrylate, and 0.16 gram of a catalyst comprising triethylborane complexed with an equimolar amount of 1,3-propanediamine. The solution was mixed for 20 seconds in a Hauschild rotary mixer. In a two ounce glass jar, 1.6 gram of acrylic acid was added to 16.0 gram of decamethyltetrasiloxane, and stirred with a Teflon® coated stirring rod. The monomer solution was dispensed by a disposable pipette over a time of approximately 10 seconds, into the contents of the open glass jar, while stirring gently by hand using a Teflon® coated stirring rod. Immediately, a fluffy white dispersion of polymer particles formed in the solution. The polymer particles were harvested by removing volatile components in a rotary evaporator at 50° C. for 2 hours, at a pressure of less than 1 millimeter of mercury. Micrographs of the polymer particles obtained by the method of Example A1 showed agglomerated particles comprising distinct primary particles having an average diameter of approximately 0.1 micron, and roughly spherical in appearance. The primary polymer particles appeared quite densely packed, and in some cases fused together.

Example 1 indicates that submicron sized primary polymer particles are rapidly polymerized at room temperature, despite very crude hand mixing of components (i)-(v) of the present invention. Elemental zirconium was detected by bulk elemental analysis of the dry powder, using wavelength dispersive x-ray fluorescence spectroscopy, but no bare zirconium (IV) acetylacetonate crystals were seen in the SEM images at any magnification. These results indicate that the active component (v), i.e., zirconium (IV) acetylacetonate crystals, were encapsulated by the polymerized mixture. In contrast, Comparative Examples 1-4 show little or no polymerization at room temperature when known peroxides are used as initiators for polymerization.

Example 2

In a 0.25 ounce polypropylene cup, 0.15 gram of a catalyst comprising triethylborane complexed with an equimolar amount of 1,3-propanediamine, was added to a mixture containing 0.25 gram of zirconium (IV) acetylacetonate, mixed with 0.75 gram of stearyl methacrylate. The solution was mixed for 20 second in a Hauschild rotary mixer. In a two ounce glass jar, 1.6 gram of acrylic acid was added to 16.0 gram of tetramethyldisiloxane, and stirred with a magnetic stirrer at approximately 200-300 rpm. The monomer solution was dispensed by a disposable pipette over a time of approximately 10 seconds, into the continuously stirred contents of the glass jar. Immediately, a white dispersion of polymer particles formed. The polymer particles were harvested by removing volatile components in a rotary evaporator at room temperature (22-24° C.) for two hours at a pressure of less than 1 millimeter of mercury. Micrographs of the polymer particles obtained by the method of Example A1 showed agglomerated polymer particles comprising distinct primary particles having an average diameter of approximately one micron and roughly spherical in appearance. The primary polymer particles appeared quite densely packed, and in some cases were fused together.

Example 3

In a 0.25 ounce polypropylene cup, 0.17 gram of a catalyst comprising triethylborane complexed with an equimolar amount of 1,3-propanediamine, was added to a mixture containing 0.25 gram of zirconium (IV) acetylacetonate, mixed with 0.75 gram of methyl methacrylate. The solution was mixed for 20 seconds in a Hauschild rotary mixer. In a two ounce glass jar, 1.6 gram of acrylic acid was added to 16.0 gram of tetramethyldisiloxane, and stirred with a magnetic stirrer at approximately 200-300 rpm. The monomer solution was dispensed by a disposable pipette over a time of approximately 10 seconds, into the continuously stirred contents of the glass jar. Immediately, a white dispersion of polymer particles formed. The polymer particles were harvested by removing volatile components in a rotary evaporator at room temperature (22-24° C.), for two hours at a pressure of less than one millimeter of mercury. Micrographs of the polymer particles obtained by the method of Example A1 showed agglomerated polymer particles comprising distinct primary polymer particles having an average diameter of approximately one micron and roughly spherical in appearance. The primary polymer particles appeared quite densely packed, and in some cases were fused together.

Example 4

In a 0.25 ounce polypropylene cup, 0.17 gram of a catalyst comprising triethylborane complexed with an equimolar amount of 1,3-propanediamine, was added to a mixture containing 0.25 gram of zirconium (IV) acetylacetonate, mixed with 0.75 gram of n-propyl methacrylate. The solution was mixed for 20 seconds in a Hauschild rotary mixer. In a two ounce glass jar, 0.17 gram of acrylic acid was added to 16.0 gram of tetramethyldisiloxane, and stirred with a magnetic stirrer at approximately 200-300 rpm. The monomer solution was dispensed by a disposable plastic pipette over a time of approximately 10 seconds, into the continuously stirred contents of the glass jar. Immediately, a white dispersion of polymer particles formed. The polymer particles were harvested by removing volatile components in a rotary evaporator at room temperature (22-24° C.) for two hours, at a pressure of less than one millimeter of mercury. Micrographs of the polymer particles obtained by the method of Example A1, showed agglomerated polymer particles comprising distinct primary polymer particles having an average diameter of approximately 0.7 micron, and roughly spherical in appearance. The primary polymer particles appeared less densely packed than in Examples 1-3, with far smaller inter-particle contacts.

Example 5

In a 0.25 ounce polypropylene cup, 0.16 gram of a catalyst comprising triethylborane complexed with an equimolar amount of 1,3-propanediamine, was added to a mixture containing 0.25 gram of zirconium (IV) acetylacetonate, mixed with 0.75 gram of n-propyl methacrylate. The solution was mixed for 20 seconds in a Hauschild rotary mixer. In a two ounce glass jar, 1.6 gram of acrylic acid was added to 16.0 gram of tetramethyldisiloxane, and stirred with a magnetic stirrer at approximately 200-300 rpm. The monomer solution was dispensed by a disposable plastic pipette over a time of approximately 10 seconds, into the continuously stirred contents of the glass jar. Immediately, a white dispersion of polymer particles formed. The polymer particles were harvested by removing volatile components in a rotary evaporator, at room temperature (22-24° C.) for two hours at a pressure of less than one millimeter of mercury. Micrographs of the polymer particles obtained by the method of Example A1, showed agglomerated polymer particles comprising distinct primary polymer particles having an average diameter of approximately 0.7 micron, and roughly spherical in appearance. The primary polymer particles appeared generally less densely packed than in Examples 1-3, but exhibited slightly more fusing between polymer particles than in Example 4.

Example 6

In a 0.25 ounce polypropylene cup, 0.17 gram of a catalyst comprising triethylborane complexed with an equimolar amount of 1,3-propanediamine, was added to a mixture containing 0.25 gram of zirconium (IV) acetylacetonate, mixed with 0.76 gram of ethyl methacrylate. The solution was mixed for 20 seconds in a Hauschild rotary mixer. In a two ounce glass jar, 0.17 gram of isophorone diisocyanate was added to 16.0 gram of tetramethyldisiloxane, and stirred with a magnetic stirrer at approximately 200-300 rpm. The monomer solution was dispensed by a disposable plastic pipette over a time of approximately 10 seconds, into the continuously stirred contents of the glass jar. Immediately, a white dispersion of polymer particles formed. The polymer particles were harvested by removing volatile components in a rotary evaporator, at room temperature (22-24° C.) for two hours at a pressure of less than one millimeter of mercury. Micrographs of the polymer particles obtained by the method of Example A1, showed agglomerated polymer particles comprising distinct primary polymer particles having an average diameter of approximately 0.7 micron, and roughly spherical in appearance. The primary polymer particles appeared generally less densely packed than in Examples 1-3, with much smaller interparticle contacts, although some fusing was observed in more densely packed regions.

Example 7

In a 0.25 ounce polypropylene cup, 0.48 gram of a catalyst comprising triethylborane complexed with an equimolar amount of 1,3-propanediamine, was added to a mixture containing 0.75 gram of zirconium (IV) acetylacetonate, mixed with 2.25 gram of methyl methacrylate. The solution was mixed for 20 seconds in a Hauschild rotary mixer. In a two ounce glass jar, 0.48 gram of isophorone diisocyanate was added to 48.0 gram of tetramethyldisiloxane, and stirred with a magnetic stirrer at approximately 200-300 rpm. The monomer solution was dispensed by a disposable plastic pipette over a time of approximately 10 seconds, into the continuously stirred contents of the glass jar. Immediately, a white dispersion of polymer particles formed. The polymer particles were harvested by removing volatile components in a rotary evaporator, at room temperature (22-24° C.) for two hours at a pressure of less than one millimeter of mercury. Micrographs of the polymer particles obtained by the method of Example A1, showed agglomerated polymer particles comprising distinct primary polymer particles having an average diameter of approximately one micron, and roughly spherical in appearance. The primary polymer particles appear less generally less densely packed than in Examples 1-3, with much smaller interparticle contacts, although some fusing was observed in more densely packed regions. The surfaces of roughly 100 micron rectangular polymer particles corresponding directly to the size and shape of the zirconium (IV) acetylacetonate crystals, were found to be covered with a polymerized sheath of densely packed microparticles, providing direct evidence of the encapsulation of the active component (v), i.e., zirconium (IV) acetylacetonate crystals.

Example 8

In a 0.25 ounce polypropylene cup, 0.18 gram of a catalyst comprising triethylborane complexed with an equimolar amount of 1,3-propanediamine, was added to a mixture containing 0.25 gram of zirconium (IV) acetylacetonate, mixed with 0.75 gram of 3-methacryloxypropyltrimethoxysilane. The solution was mixed for 20 seconds in a Hauschild rotary mixer. In a two ounce glass jar, 1.6 gram of acrylic acid was added to 16.0 gram of tetramethyldisiloxane, and stirred with a magnetic stirrer at approximately 200-300 rpm. The monomer solution was dispensed by a disposable plastic pipette over a time of approximately 10 seconds, into the continuously stirred contents of the glass jar. Immediately, a dispersion of polymer particles formed. The polymer particles were harvested by removing volatile components in a rotary evaporator, at room temperature (22-24° C.) for two hours at a pressure of less than one millimeter of mercury. Micrographs of the polymer particles obtained by the method of Example A1, showed agglomerated polymer particles comprising distinct primary polymer particles having an average diameter of approximately one micron, and roughly spherical in appearance. The resulting polymer particle size distribution was more polydisperse than in Examples 1-7, with primary polymer particles ranging from 0.2-2 millimeter and a few polymer particles as small as 50 nanometer, adhered to the larger polymer particles. The primary polymer particles appeared generally less densely packed than in Examples 1-3, with smaller interparticle contacts, although some fusing was observed in more densely packed regions.

Examples 1-8 illustrate that the composition and method of the invention produce polymer microparticles that encapsulate an active ingredient at varying concentrations with a range of monomers used as component (i), and with two different types of amine reactive compounds for component (iv).

Example 9

In a 0.25 ounce polypropylene cup, 0.16 gram of a catalyst comprising triethylborane complexed with an equimolar amount of 1,3-propanediamine, was added to a mixture containing 0.06 gram of zirconium (IV) acetylacetonate, mixed with one gram of methyl methacrylate. The solution was mixed for 20 seconds in a Hauschild rotary mixer. In a two ounce glass jar, 1.6 gram of acrylic acid was added to 16.0 gram of heptane, and stirred with a magnetic stirrer at approximately 200-300 rpm. The monomer solution was dispensed by a disposable plastic pipette over a time of approximately 5 seconds, into the continuously stirred contents of the glass jar. Immediately, a dispersion of polymer particles formed.

Example 10

In a 0.25 ounce polypropylene cup, 0.16 gram of a catalyst comprising triethylborane complexed with an equimolar amount of 1,3-propanediamine, was added to a mixture containing 0.06 gram of zirconium (IV) acetylacetonate, mixed with one gram of methyl methacrylate. The solution was mixed for 20 seconds in a Hauschild rotary mixer. In a two ounce glass jar, 1.6 gram of acrylic acid was added to 16.0 gram of polydimethylsiloxane having a viscosity of 200 centistoke (mm$^2$/sec) at 25° C., and stirred with a magnetic stirrer at approximately 300-400 rpm. The monomer solution was dispensed by a disposable plastic pipette over a time of approximately five seconds, into the continuously stirred contents of the glass jar. Immediately, a dispersion of polymer particles formed.

Examples 1, 9 and 10 show that a variety of poor or non-solvents may be used as component (iii) to produce polymer microparticles that encapsulate an active ingredient according to the invention.

Example 11

In a one ounce polypropylene cup, 1.60 gram of a catalyst comprising triethylborane complexed with an equimolar amount of 1,3-propanediamine, was added to 10.00 gram of stearyl methacrylate, and mixed for 20 seconds in a Hauschild rotary mixer. To this solution was added, 10.60 gram of deionized water, and 0.89 gram of a sodium $C_{14-17}$ secondary alkyl sulfonate anionic surfactant, sold under the trademark Hostapur® SAS 30, a product of Clariant Corporation, Mount Holly, N.C. The solution was immediately placed in contact with an ultrasonic probe, and homogenized for 10 seconds to form a white emulsion. To this emulsion was added, 1.4 gram of isophoronediisocyanate, and mixed for 20 seconds in a Hauschild mixer. Upon opening the lid, modest heat generation within the container could be detected by a gloved hand. A portion of the sample was allowed to dry in a 70° C. forced air convection oven for 10 minutes, yielding a polymer film.

Example 12

To the aqueous emulsion of Example 11, containing stearyl methacrylate, Hostapur® SAS 30, and the triethylborane-1,3-propanediamine complex, was added 5 drops of acrylic acid. This immediately formed a viscous polymer. Examples 11 and 12 demonstrate that polymerization according to the invention is feasible in an aqueous medium, when the catalyst and the monomer are pre-emulsified.

Example 13

In a 0.25 ounce polypropylene cup, 0.23 gram of dimethylmethacryloxypropylsilyl terminated polydimethylsiloxane having a number average molecular weight of 8220 g/mol and a polydispersity index of 1.9, was added to a mixture containing 0.20 gram of activated carbon, and mixed with 0.22 gram of an organopolysiloxane resin having the structure $M_{0.2}D_{0.2}T(methacryloxypropyl)_{0.3}T_{0.3}$, a number average molecular weight of 1330 g/mol and polydispersity index of 1.4. Molecular weight averages and distributions were determined by gel permeation chromatography in tetrahydrofuran using polystyrene standards. The mixture was allowed to mix for 20 seconds in a Hauschild rotary mixer before adding 0.062 gram of a catalyst comprising triethylborane complexed with an equimolar amount of 1,3-propanediamine, and 0.33 g of decamethyltetrasiloxane. The solution was again mixed for 20 seconds in a Hauschild rotary mixer. In a two ounce glass jar, 0.32 grain of acrylic acid was added to 17.3 grams of acetone, and stirred with a magnetic stirrer at approximately 200-300 rpm. The monomer solution was dispensed by a disposable plastic pipette over a time of approximately five seconds, into the continuously stirred contents of the glass jar. Immediately, a dispersion of activated carbon particles encapsulated in a crosslinked organopolysiloxane matrix formed. The encapsulated polymer particles were recovered by allowing the acetone and decamethyltetrasiloxane to evaporate at room temperature. The effectiveness of encapsulation was verified by SEM and EDS analysis. The analysis revealed a silicon rich coating over the activated carbon particles that had a distinctly different surface topology and composition from the unencapsulated activated carbon particles, at all magnifications from 50× to 25,000×. This example demonstrates that the composition and method of the invention can be applied to non-polar, polymeric free-radical polymerizable species, for encapsulating active ingredients such as activated carbon.

Other variations may be made in compounds, compositions, and methods described herein without departing from the essential features of the invention. The embodiments of the invention specifically illustrated herein are exemplary only and not intended as limitations on their scope except as defined in the appended claims.

I claim:

1. A composition comprising a mixture or a polymerized product of a mixture comprising (i) a free radical polymerizable monomer, oligomer or polymer; (ii) an organoborane amine complex, (iii) a poor or non-solvent for the polymerized product of (i); and (iv) an amine reactive compound, wherein the organoborane amine complex (ii) is a complex formed between an organoborane and an amine compound, the organoborane having the formula $BR''_3$ where $R''$ is a linear, branched, aliphatic, or aromatic hydrocarbon group containing 1-20 carbon atoms; and wherein the amine compound is an organic amine compound or a silicon containing amine compound; and the organoborane amine complex is attached to solid particles.

2. A composition according to claim 1 wherein the composition further comprises (v) an active ingredient that is encapsulated by the polymerized product.

3. A composition according to claim 2 wherein the active ingredient (v) is selected from the group consisting of vitamins, inks, conductive particles, magnetic particles, dielectric particles, drugs, solvents, fertilizers, herbicides, pesticides, cure catalysts, adhesion promoters, crosslinking agents free of free radical polymerizable groups, monomers and reactants for compositions curable by mechanisms other than free radical polymerization, solid particles, conductive solid particles, pigments, dyes, flavors, cosmetic agents, healthcare agents, fragrances, and water.

4. A composition according to claim 1 wherein the free radical polymerizable monomer, oligomer, or polymer (i) is an organic compound (a); a mixture of mono-functional or multi-functional organic compounds (b); an organosilicon monomer, oligomer, or polymer (c); a mixture of mono-functional or multi-functional organosilanes (d); a mixture of mono-functional or multi-functional organopolysiloxanes (e); or a mixture of (a)-(e); in which (a)-(e) are unsaturated and capable of undergoing free radical polymerization.

5. A composition according to claim 1 wherein the poor or non-solvent (iii) is selected from the group consisting of water, polar organic solvents, non-polar organic solvents, organosilanes, linear organosiloxane fluids, cyclic organosiloxane fluids, organosiloxane oligomers, organosiloxane resins, organosiloxane polymers, ionic liquids, and supercritical fluids.

6. A composition according to claim 1 wherein the amine reactive compound (iv) is a compound having amine reactive groups, and is selected from the group consisting of mineral acids, Lewis acids, carboxylic acids, carboxylic acid derivatives, carboxylic acid metal salts, isocyanates, aldehydes, epoxides, acid chlorides, and sulphonyl chlorides.

7. A composition according to claim 1, where components (ii) and (iv) are physically or chemically isolated until just prior to a time when it is desirable to initiate polymerization.

8. A composition comprising a mixture or a polymerized product of a mixture comprising (i) a free radical polymerizable monomer, oligomer or polymer; (ii) an organoborane amine complex, (iii) a poor or non-solvent for the polymerized product of (i); and (iv) an amine reactive compound; wherein the amine reactive compound (iv) is a compound having amine reactive groups, and is selected from the group consisting of mineral acids, Lewis acids, carboxylic acids, carboxylic acid derivatives, carboxylic acid metal salts, isocyanates, aldehydes, epoxides, acid chlorides, and sulphonyl chlorides; and wherein the amine reactive groups are borne by an organosilane, an organopolysiloxane, an organotitanate, or an organozirconate.

9. A composition according to claim 8 wherein the composition further comprises (v) an active ingredient that is encapsulated by the polymerized product.

10. A composition according to claim 9 wherein the active ingredient (v) is selected from the group consisting of vitamins, inks, conductive particles, magnetic particles, dielectric particles, drugs, solvents, fertilizers, herbicides, pesticides, cure catalysts, adhesion promoters, crosslinking agents free of free radical polymerizable groups, monomers and reactants for compositions curable by mechanisms other than free radical polymerization, solid particles, conductive solid particles, pigments, dyes, flavors, cosmetic agents, healthcare agents, fragrances, and water.

11. A composition according to claim 8 wherein the free radical polymerizable monomer, oligomer, or polymer (i) is an organic compound (a); a mixture of mono-functional or multi-functional organic compounds (b); an organosilicon monomer, oligomer, or polymer (c); a mixture of mono-functional or multi-functional organosilanes (d); a mixture of mono-functional or multi-functional organopolysiloxanes (e); or a mixture of (a)-(e); in which (a)-(e) are unsaturated and capable of undergoing free radical polymerization.

12. A composition according to claim 8 wherein the poor or non-solvent (iii) is selected from the group consisting of water, polar organic solvents, non-polar organic solvents, organosilanes, linear organosiloxane fluids, cyclic organosiloxane fluids, organosiloxane oligomers, organosiloxane resins, organosiloxane polymers, ionic liquids, and supercritical fluids.

13. A composition according to claim 8 wherein the amine reactive compound (iv) is attached to solid particles.

14. A composition according to claim 8, where components (ii) and (iv) are physically or chemically isolated until just prior to a time when it is desirable to initiate polymerization.

15. A composition comprising a mixture or a polymerized product of a mixture comprising (i) a free radical polymerizable monomer, oligomer or polymer; (ii) an organoborane amine complex, (iii) a poor or non-solvent for the polymerized product of (i); and (iv) an amine reactive compound; wherein the amine reactive compound (iv) is a compound having amine reactive groups, and is selected from the group consisting of mineral acids, Lewis acids, carboxylic acids, carboxylic acid derivatives, carboxylic acid metal salts, isocyanates, aldehydes, epoxides, acid chlorides, and sulphonyl chlorides; and wherein the amine reactive compound (iv) is attached to solid particles.

16. A composition comprising a mixture or a polymerized product of a mixture comprising (i) a free radical polymerizable monomer, oligomer or polymer; (ii) an organoborane amine complex, (iii) a poor or non-solvent for the polymerized product of (i); and (iv) an amine reactive compound; wherein the amine reactive compound (iv) is a photoacid generator.

17. A composition according to claim 16 wherein the composition further comprises (v) an active ingredient that is encapsulated by the polymerized product.

18. A composition according to claim 17 wherein the active ingredient (v) is selected from the group consisting of vitamins, dyes, inks, conductive particles, magnetic particles, dielectric particles, drugs, solvents, fertilizers, herbicides, pesticides, cure catalysts, adhesion promoters, crosslinking agents free of free radical polymerizable groups, monomers and reactants for compositions curable by mechanisms other than free radical polymerization, solid particles, conductive solid particles, pigments, dyes, flavors, cosmetic agents, healthcare agents, fragrances, and water.

19. A composition according to claim 16 wherein the free radical polymerizable monomer, oligomer, or polymer (i) is an organic compound (a); a mixture of mono-functional or multi-functional organic compounds (b); an organosilicon monomer, oligomer, or polymer (c); a mixture of mono-functional or multi-functional organosilanes (d); a mixture of mono-functional or multi-functional organopolysiloxanes (e); or a mixture of (a)-(e); in which (a)-(e) are unsaturated and capable of undergoing free radical polymerization.

20. A composition according to claim 16 wherein the organoborane amine complex (ii) is a complex formed between an organoborane and an amine compound, the organoborane having the formula $BR''_3$ where R" is a linear, branched, aliphatic, or aromatic hydrocarbon group containing 1-20 carbon atoms; and wherein the amine compound is an organic amine compound or a silicon containing amine compound.

21. A composition according to claim 16 wherein the poor or non-solvent (iii) is selected from the group consisting of water, polar organic solvents, non-polar organic solvents, organosilanes, linear organosiloxane fluids, cyclic organosiloxane fluids, organosiloxane oligomers, organosiloxane resins, organosiloxane polymers, ionic liquids, and supercritical fluids.

22. A composition according to claim 16 wherein the photoacid generator (iv) is attached to solid particles.

23. A composition according to claim 16, where components (ii) and (iv) are physically or chemically isolated until just prior to a time when it is desirable to initiate polymerization.

24. A method of making polymer particles comprising (A) forming a composition containing (i) a free radical polymerizable monomer, oligomer or polymer; (ii) an organoborane amine complex, (iii) a poor or non-solvent for the polymerized product of (i); and (iv) an amine reactive compound, wherein the amine reactive compound (iv) is a compound having amine reactive groups, and is selected from the group consisting of mineral acids, Lewis acids, carboxylic acids, carboxylic acid derivatives, carboxylic acid metal salts, isocyanates, aldehydes, epoxides, acid chlorides, and sulphonyl chlorides; and wherein the amine reactive groups are borne by an organosilane, an organopolysiloxane, an organotitanate, or an organozirconate; (B) agitating components (i)-(iv) of the composition in the presence of oxygen to initiate polymerization, at a rate and for a time sufficient to provide a uniform dispersion and reaction of the components; (C) allowing the reaction to proceed to completion at room temperature; and (D) recovering the polymer particles by removing the poor or non-solvent from the composition.

25. A method according to claim 24 wherein the composition includes (v) an active ingredient that is encapsulated by the polymer particles.

26. A method according to claim 25 wherein the active ingredient (v) is selected from the group consisting of vitamins, inks, conductive particles, magnetic particles, dielectric particles, drugs, solvents, fertilizers, herbicides, pesticides, cure catalysts, adhesion promoters, crosslinking agents free of free radical polymerizable groups, monomers and reactants for compositions curable by mechanisms other than free radical polymerization, solid particles, conductive solid particles, pigments, dyes, flavors, cosmetic agents, healthcare agents, fragrances, and water.

27. A method according to claim 24 wherein the free radical polymerizable monomer, oligomer, or polymer (i) is an organic compound (a); a mixture of mono-functional or multi-functional organic compounds (b); an organosilicon monomer, oligomer, or polymer (c); a mixture of mono-functional or multi-functional organosilanes (d); a mixture of mono-functional or multi-functional organopolysiloxanes (e); or a mixture of (a)-(e); in which (a)-(e) are unsaturated and capable of undergoing free radical polymerization.

28. A method according to claim 24 wherein the organoborane amine complex (ii) is a complex formed between an organoborane and an amine compound, the organoborane having the formula $BR''_3$ where R" is a linear, branched, aliphatic, or aromatic hydrocarbon group containing 1-20 carbon atoms; and wherein the amine compound is an organic amine compound or a silicon containing amine compound.

29. A method according to claim 28 wherein the organoborane amine complex is attached to solid particles.

30. A method according to claim 24 wherein the poor or non-solvent (iii) is selected from the group consisting of water, polar organic solvents, non-polar organic solvents, organosilanes, linear organosiloxane fluids, cyclic organosiloxane fluids, organosiloxane oligomers, organosiloxane resins, organosiloxane polymers, ionic liquids, and supercritical fluids.

31. A method according to claim 30 wherein the poor or non-solvent (iii) is acetone, hexane, cyclohexane, heptane, hexamethyldisiloxane, octamethyltrisiloxane, octamethylcyclotetrasiloxane, decamethylcyclopentasiloxane, decamethyltetrasiloxane, or a mixture thereof.

32. A method according to claim 24 wherein the amine reactive compound (iv) is attached to solid particles.

33. A method according to claim 24 wherein the amine reactive compound (iv) is a compound capable of generating amine reactive groups when exposed to ultraviolet radiation.

34. A method according to claim 24, further comprising physically or chemically isolating components (ii) and (iv) prior to step (A).

35. A method of making polymer particles comprising (A) forming a composition containing (i) a free radical polymerizable monomer, oligomer or polymer; (ii) an organoborane amine complex, (iii) a poor or non-solvent for the polymerized product of (i); and (iv) an amine reactive compound, wherein the organoborane amine complex (ii) is a complex formed between an organoborane and an amine compound, the organoborane having the formula $BR''_3$ where R" is a linear, branched, aliphatic, or aromatic hydrocarbon group containing 1-20 carbon atoms; and wherein the amine compound is an organic amine compound or a silicon containing amine compound, and the organoborane amine complex is attached to solid particles; (B) agitating components (i)-(iv) of the composition in the presence of oxygen to initiate polymerization, at a rate and for a time sufficient to provide a uniform dispersion and reaction of the components; (C) allowing the reaction to proceed to completion at room temperature; and (D) recovering the polymer particles by removing the poor or non-solvent from the composition.

36. A method according to claim 35 wherein the composition further comprises (v) an active ingredient that is encapsulated by the polymerized product.

37. A method of making polymer particles comprising (A) forming a composition containing (i) a free radical polymerizable monomer, oligomer or polymer; (ii) an organoborane amine complex, (iii) a poor or non-solvent for the polymerized product of (i); and (iv) an amine reactive compound; wherein the amine reactive compound (iv) is a compound having amine reactive groups, and is selected from the group consisting of mineral acids, Lewis acids, carboxylic acids, carboxylic acid derivatives, carboxylic acid metal salts, isocyanates, aldehydes, epoxides, acid chlorides, and sulphonyl chlorides; and wherein the amine reactive compound (iv) is attached to solid particles; (B) agitating components (i)-(iv) of the composition in the presence of oxygen to initiate polymerization, at a rate and for a time sufficient to provide a uniform dispersion and reaction of the components; (C) allowing the reaction to proceed to completion at room temperature; and (D) recovering the polymer particles by removing the poor or non-solvent from the composition.

38. A method according to claim 37 wherein the composition further comprises (v) an active ingredient that is encapsulated by the polymerized product.

39. A method of making polymer particles comprising (A) forming a composition containing (i) a free radical polymerizable monomer, oligomer or polymer; (ii) an organoborane amine complex, (iii) a poor or non-solvent for the polymerized product of (i); and (iv) an amine reactive compound; wherein the amine reactive compound (iv) is a photoacid generator (B) agitating components (i)-(iv) of the composition in the presence of oxygen to initiate polymerization, at a rate and for a time sufficient to provide a uniform dispersion and reaction of the components; (C) allowing the reaction to proceed to completion at room temperature; and (D) recovering the polymer particles by removing the poor or non-solvent from the composition.

40. A method according to claim 39 wherein the composition further comprises (v) an active ingredient that is encapsulated by the polymerized product.

* * * * *